US012471444B2

(12) United States Patent
Shang et al.

(10) Patent No.: US 12,471,444 B2
(45) Date of Patent: Nov. 11, 2025

(54) DISPLAY PANEL AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Tinghua Shang, Beijing (CN); Fan He, Beijing (CN); Hongwei Ma, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 346 days.

(21) Appl. No.: 18/034,531

(22) PCT Filed: Dec. 9, 2020

(86) PCT No.: PCT/CN2020/134849
§ 371 (c)(1),
(2) Date: Apr. 28, 2023

(87) PCT Pub. No.: WO2022/120627
PCT Pub. Date: Jun. 16, 2022

(65) Prior Publication Data
US 2025/0081762 A1 Mar. 6, 2025

(51) Int. Cl.
*H10K 59/121* (2023.01)
*G06F 3/041* (2006.01)
(Continued)

(52) U.S. Cl.
CPC ..... *H10K 59/1213* (2023.02); *G06F 3/04164* (2019.05); *H10K 59/131* (2023.02);
(Continued)

(58) Field of Classification Search
None
See application file for complete search history.

(56) References Cited

U.S. PATENT DOCUMENTS

2018/0174505 A1   6/2018  Mandlik et al.
2020/0175901 A1*  6/2020  Lee ..................... G09G 3/006
(Continued)

FOREIGN PATENT DOCUMENTS

CN   109752421 A   5/2019
CN   110620103 A   12/2019
(Continued)

OTHER PUBLICATIONS

CN202080003259.5 first office action.
PCT/CN2020/134849 international search report.

*Primary Examiner* — Kyoung Lee
(74) *Attorney, Agent, or Firm* — IPro, PLLC

(57) ABSTRACT

A display panel includes a display area including at least one through hole and an annular non-display area between the through hole and the display area enclosing the through hole. The annular non-display area includes: at least two annular blocking dams, a through-hole crack detecting line, and a connecting portion. The annular blocking dams enclose the through hole and are mutually nested. Adjacent annular blocking dams are spaced at a predetermined distance. The through-hole crack detecting line comprises an input wiring portion, an output wiring portion and a winding portion. The input wiring portion and the output wiring portion are connected through the winding portion. The input wiring portion and the output wiring portion extend to the display area. The winding portion is around the edge of the through hole. The connecting portion is between the annular blocking dams and connecting some areas of the annular blocking dams.

14 Claims, 10 Drawing Sheets

(51) Int. Cl.
  *H10K 59/131*   (2023.01)
  *H10K 59/40*    (2023.01)
  *H10K 59/88*    (2023.01)
  H10K 59/65      (2023.01)
  H10K 59/80      (2023.01)
  H10K 102/00     (2023.01)

(52) U.S. Cl.
  CPC ............ *H10K 59/40* (2023.02); *H10K 59/88* (2023.02); H10K 59/65 (2023.02); H10K 59/873 (2023.02); H10K 2102/341 (2023.02)

(56) References Cited

U.S. PATENT DOCUMENTS

| | | |
|---|---|---|
| 2020/0265783 A1 | 8/2020 | Lee et al. |
| 2021/0210713 A1 | 7/2021 | Li et al. |
| 2022/0246880 A1* | 8/2022 | Jeong .................. H10K 59/873 |

FOREIGN PATENT DOCUMENTS

| | | |
|---|---|---|
| CN | 111106151 A | 5/2020 |
| CN | 111146261 A | 5/2020 |
| CN | 111579215 A | 8/2020 |

* cited by examiner

DISPLAY PANEL AND DISPLAY DEVICE

CROSS-REFERENCE TO RELATED APPLICATIONS

This application is a National Stage of International Application No. PCT/CN2020/134849, filed Dec. 9, 2020, the entire content of which is hereby incorporated by reference.

FIELD

The present disclosure relates to the technical field of display, in particular to a display panel and a display apparatus.

BACKGROUND

In recent years, display products with under-display cameras emerge in endlessly. The under-display camera may increase a screen-to-body ratio and provide users with a better using experience. A hole digging design of a display screen is required for the under-display camera. For a digging screen, cracks may occur at an edge of a dug hole position. Thus crack detection needs to be performed on the edge of the dug hole.

In the current crack detection, a circle of crack detecting line is arranged at the edge of the dug hole. Whether there are cracks is determined by detecting relevant electrical parameters of the crack detecting line. However, there is usually a residual metal layer at the edge of the dug hole, and the residual metal layer may cause a problem of failure in crack detection.

SUMMARY

Embodiments of the present disclosure provide a display panel, including:
  a display area, used for image display, and including at least one through hole; and
  an annular non-display area, located between the through hole and the display area enclosing the through hole.
The annular non-display area includes:
  at least two annular blocking dams, wherein each annular blocking dam encloses the through hole, all the annular blocking dams are mutually nested, and the adjacent annular blocking dams are spaced at a predetermined distance;
  a through-hole crack detecting line, configured to perform crack detection on an edge of the through hole, wherein the through-hole crack detecting line includes: an input wiring portion, an output wiring portion and a winding portion, the input wiring portion and the output wiring portion are connected through the winding portion, the input wiring portion and the output wiring portion extend to the display area, and the winding portion is arranged around the edge of the through hole; and
  a connecting portion, located between the annular blocking dams and connecting some areas of the annular blocking dams.
In some embodiments of the present disclosure, the annular non-display area includes:
  a first annular blocking dam, enclosing the through hole; and
  a second annular blocking dam, enclosing the first annular blocking dam.

The connecting portion is located between the first annular blocking dam and the second annular blocking dam and connects some areas of the first annular blocking dam and the second annular blocking dam.

In some embodiments of the present disclosure, the annular non-display area includes one connecting portion.

The input wiring portion and the output wiring portion respectively extend from the display area into the first annular blocking dam through a surface of the connecting portion, and orthographic projections of both the input wiring portion and the output wiring portion in the annular non-display area have overlapping areas with an orthographic projection of the connecting portion in the annular non-display area; and the winding portion is located in the first annular blocking dam, and surrounds the through hole by taking an end of the input wiring portion located in the first annular blocking dam as a starting point and taking an end of the output wiring portion located in the first annular blocking dam as an end point.

The input wiring portion and the output wiring portion are spaced at a predetermined distance.

In some embodiments of the present disclosure, the annular non-display area includes the two connecting portions, namely a first connecting portion and a second connecting portion respectively; and the first connecting portion and the second connecting portion are located on the same side of the through hole, and the first connecting portion and the second connecting portion are spaced at a predetermined distance.

The input wiring portion extends from the display area into the first annular blocking dam through a surface of the first connecting portion, and an orthographic projection of the input wiring portion in the annular non-display area has an overlapping area with an orthographic projection of the first connecting portion in the annular non-display area; the output wiring portion extends from the display area into the first annular blocking dam through a surface of the second connecting portion, and an orthographic projection of the output wiring portion in the annular non-display area has an overlapping area with an orthographic projection of the second connecting portion in the annular non-display area; and the winding portion is located in the first annular blocking dam, and surrounds the through hole by taking an end of the input wiring portion located in the first annular blocking dam as a starting point and taking an end of the output wiring portion located in the first annular blocking dam as an end point.

In some embodiments of the present disclosure, the annular non-display area includes the two connecting portions, namely a first connecting portion and a second connecting portion respectively: the first connecting portion is located on one side of the through hole, and the second connecting portion is located on an opposite side of the through hole; and the first annular blocking dam and the second annular blocking dam are cut to be at a first side and a second side which are oppositely arranged by the first connecting portion and the second connecting portion.

The input wiring portion extends from the display area to a position between the first annular blocking dam and the second annular blocking dam on the first side through a surface of the second annular blocking dam, an orthographic projection of the input wiring portion in the annular non-display area has an overlapping area with an orthographic projection of the second annular blocking dam in the annular non-display area, the orthographic projection of the input wiring portion in the annular non-display area and an orthographic projection of the first connecting portion in the annular non-display area do not mutually overlap, and the input wiring portion is located adjacent to the first side of the first connecting portion; and the output wiring portion extends from the display area to the position between the first annular blocking dam and the second annular blocking dam on the second side through the surface of the second annular blocking dam, an orthographic projection of the output wiring portion in the annular non-display area has an overlapping area with an orthographic projection of the second annular blocking dam in the annular non-display area, the orthographic projection of the output wiring portion in the annular non-display area and the orthographic projection of the first connecting portion in the annular non-display area do not mutually overlap, and the output wiring portion is located adjacent to the second side of the first connecting portion.

The winding portion includes a first connecting wire portion, a second connecting wire portion, a first winding portion, a second winding portion, and a third winding portion.

The first connecting wire portion extends from the position between the first annular blocking dam and the second annular blocking dam into the first annular blocking dam on the first side through a surface of the first annular blocking dam, an orthographic projection of the first connecting wire portion in the annular non-display area has an overlapping area with an orthographic projection of the first annular blocking dam in the annular non-display area, the orthographic projection of the first connecting wire portion in the annular non-display area and an orthographic projection of the second connecting portion in the annular non-display area do not mutually overlap, and the first connecting wire portion is located adjacent to the first side of the second connecting portion; the second connecting wire portion extends from the position between the first annular blocking dam and the second annular blocking dam into the first annular blocking dam on the second side through the surface of the first annular blocking dam, an orthographic projection of the second connecting wire portion in the annular non-display area has an overlapping area with the orthographic projection of the first annular blocking dam in the annular non-display area, the orthographic projection of the second connecting wire portion in the annular non-display area and the orthographic projection of the second connecting portion in the annular non-display area do not mutually overlap, and the second connecting wire portion is located adjacent to the second side of the second connecting portion; the first winding portion is located between the first annular blocking dam and the second annular blocking dam on the first side, and connects the input wiring portion with the first connecting wire portion; the second winding portion is located between the first annular blocking dam and the second annular blocking dam on the second side, and connects the output wiring portion with the second connecting wire portion; and the third winding portion is located in the first annular blocking dam, and surrounds the through hole by taking an end of the first connecting wire portion located in the first annular blocking dam as a starting point and taking an end of the second connecting wire portion located in the first annular blocking dam as an end point.

In some embodiments of the present disclosure, the display area includes:
  a base substrate;
  a driving circuit layer, located on the base substrate;
  an organic light-emitting diode device layer, located on one side of the driving circuit layer facing away from the base substrate;
  an encapsulation layer, located on one side of the organic light-emitting diode device layer facing away from the base substrate; and
  a touch control functional layer, located on one side of the encapsulation layer facing away from the organic light-emitting diode device layer.

The touch control functional layer includes at least one metal layer, and the through-hole crack detecting line is arranged on the same layer as one metal layer in the touch control functional layer.

In some embodiments of the present disclosure, the touch control functional layer includes:
  a touch control blocking layer, located on a surface of one side of the encapsulation layer facing away from the organic light-emitting diode device layer;
  a first touch control electrode layer, located on a surface of one side of the touch control blocking layer facing away from the encapsulation layer;
  an insulating layer, located on a surface of one side of the first touch control electrode layer facing away from the touch control blocking layer;
  a second touch control electrode layer, located on a surface of one side of the insulating layer facing away from the first touch control electrode layer; and
  a protection layer, located on a surface of one side of the second touch control electrode layer facing away from the insulating layer.

The through-hole crack detecting line is arranged on the same layer as the first touch control electrode layer or the second touch control electrode layer.

In some embodiments of the present disclosure, the driving circuit layer includes:
  a buffer layer, located on the base substrate;
  an active layer, located on one side of the buffer layer facing away from the base substrate;
  a gate insulating layer, located on one side of the active layer facing away from the buffer layer;
  a gate metal layer, located on one side of the gate insulating layer facing away from the active layer;
  an interlayer insulating layer, located on one side of the gate metal layer facing away from the gate insulating layer;
  a source-drain metal layer, located on one side of the interlayer insulating layer facing away from the gate metal layer; and
  a planarization layer, located on one side of the source-drain metal layer facing away from the interlayer insulating layer.

The organic light-emitting diode device layer includes:
  a first electrode layer, located on one side of the planarization layer facing away from the source-drain metal layer, and including a plurality of mutually discrete first electrodes;
  a pixel defining layer, located on one side of the planarization layer facing away from the source-drain metal layer, and located at a spacing position between all the first electrodes;
  a supporting portion, located on one side of the pixel defining layer facing away from the planarization layer;
  a light-emitting layer, located on one sides of the first electrodes facing away from the planarization layer; and
  a second electrode layer, located on one sides of the light-emitting layer, the pixel defining layer and the supporting portion facing away from the planarization layer.

The annular blocking dams have a plurality of stacked film layers, and the film layers included by the annular blocking dams are arranged on the same layer as at least one of the planarization layer, the pixel defining layer, or the supporting portion respectively.

In some embodiments of the present disclosure, the display panel further includes: a peripheral non-display area, enclosing the display area.

The peripheral non-display area includes:
- a driving chip, located in the peripheral non-display area on one side of the display area; and
- a peripheral crack detecting line, configured to perform crack detecting on a peripheral edge of the display panel, and arranged around the edge of the display area, wherein at least part of the peripheral crack detecting line is connected to the through-hole crack detecting line, and at least one end of the peripheral crack detecting line is connected to the driving chip.

Part of the peripheral non-display area at a side edge, where the driving chip is located, of the display area is a first area, and parts of the peripheral non-display area at two side edges, adjacent to the side edge where the driving chip is located, of the display area are a second area and a third area respectively; and a part of the peripheral crack detecting line extends along the second area, and another part of the peripheral crack detecting line extends along the third area.

In some embodiments of the present disclosure, the display area includes:
- a plurality of pixel units, distributed in an array into a plurality of pixel unit columns; and
- a plurality of data signal lines, extending in a direction of the pixel unit columns, one data signal line being connected to one column of pixel units.

The peripheral crack detecting line includes an input portion and an output portion.

One end of the input portion of the peripheral crack detecting line located in the second area is connected to a pin of the driving chip, and the input portion takes a position connected to the driving chip as a starting point to extend to a position of the through hole around the display area along the second area, so as to be connected to the input wiring portion of the through-hole crack detecting line; and one end of the output portion of the peripheral crack detecting line located in the second area is connected to the output wiring portion of the through-hole crack detecting line, and the output portion takes a position connected to the output wiring portion as a starting point to extend to the first area around the display area along the second area, so as to be connected to a data signal line of the display area.

One end of the input portion of the peripheral crack detecting line located in the third area is connected to the other pin of the driving chip, and the input portion takes the position connected to the driving chip as the starting point to extend to a position near the through hole around the display area along the third area, so as to be connected to one end of the output portion of the peripheral crack detecting line located in the third area; and the output portion of the peripheral crack detecting line located in the third area takes a position connected to the input portion as a starting point to extend to the first area around the display area along the third area, so as to be connected to the other data signal line of the display area.

In some embodiments of the present disclosure, the input portion of the peripheral crack detecting line located in the second area is connected to a first output pin of the driving chip, and the input portion of the peripheral crack detecting line located in the third area is connected to a second output pin of the driving chip.

The peripheral non-display area further includes:
- a first switching transistor, located in the first area, wherein a control pole of the first switching transistor is connected to a third output pin of the driving chip, a first pole of the first switching transistor is connected to the output portion of the peripheral crack detecting line located in the second area, and a second pole of the first switching transistor is connected to a first data signal line in the display area;
- a second switching transistor, located in the first area and adjacent to the first switching transistor, wherein a control pole of the second switching transistor is connected to the control pole of the first switching transistor, a first pole of the second switching transistor is connected to a fourth output pin of the driving chip, and a second pole of the second switching transistor is connected to a second data signal line in the display area;
- a third switching transistor, located in the first area and located on one side of the first switching transistor facing away from the second switching transistor, wherein a control pole of the third switching transistor is connected to the control pole of the first switching transistor, a first pole of the third switching transistor is connected to the fourth output pin of the driving chip, and a second pole of the third switching transistor is connected to a third data signal line in the display area; and the second data signal line and the third data signal line are respectively located on two sides of the first data signal line;
- a fourth switching transistor, located in the first area, wherein a control pole of the fourth switching transistor is connected to a fifth output pin of the driving chip, a first pole of the fourth switching transistor is connected to the output portion of the peripheral crack detecting line located in the third area, and a second pole of the fourth switching transistor is connected to a fourth data signal line in the display area;
- a fifth switching transistor, located in the first area and adjacent to the fourth switching transistor, wherein a control pole of the fifth switching transistor is connected to the control pole of the fourth switching transistor, a first pole of the fifth switching transistor is connected to a sixth output pin of the driving chip, and a second pole of the fifth switching transistor is connected to a fifth data signal line in the display area; and
- a sixth switching transistor, located in the first area and located on one side of the fourth switching transistor facing away from the fifth switching transistor, wherein a control pole of the sixth switching transistor is connected to the control pole of the fourth switching transistor, a first pole of the sixth switching transistor is connected to the sixth output pin of the driving chip, and a second pole of the sixth switching transistor is connected to a sixth data signal line in the display area; and the fifth data signal line and the sixth data signal line are respectively located on two sides of the fourth data signal line.

In some embodiments of the present disclosure, the peripheral non-display area further includes:
- a panel crack detecting line, arranged around an edge position of the display area, wherein a part of the panel crack detecting line extends along the second area, and the other part of the panel crack detecting line extends along the third area.

The peripheral crack detecting line located in the second area is connected to the first pole of the first switching transistor through the panel crack detecting line located in the second area, and the peripheral crack detecting line located in the third area is connected to the first pole of the fourth switching transistor through the panel crack detecting line located in the third area.

The panel crack detecting line includes an input portion and an output portion.

The input portion of the panel crack detecting line located in the second area is connected to the output portion of the peripheral crack detecting line located in the second area, and the input portion takes a position connected to the peripheral crack detecting line as the starting point to extend to a position near the through hole around the display area along the second area, so as to be connected to one end of the output portion of the panel crack detecting line located in the second area; and the output portion of the panel crack detecting line located in the second area takes the position connected to the input portion as the starting point to extend back to the first area around the display area along the second area, so as to be connected to the first pole of the first switching transistor.

The input portion of the panel crack detecting line located in the third area is connected to the output portion of the peripheral crack detecting line located in the third area, and the input portion takes the position connected to the peripheral crack detecting line as the starting point to extend to the position near the through hole around the display area along the third area, so as to be connected to one end of the output portion of the panel crack detecting line located in the third area; and the output portion of the panel crack detecting line located in the third area takes the position connected to the input portion as the starting point to extend back to the first area around the display area along the third area, so as to be connected to the first pole of the fourth switching transistor.

In some embodiments of the present disclosure, the peripheral crack detecting line includes an input portion and an output portion. One end of the input portion is connected to a pin of the driving chip, and the input portion takes a position connected to the driving chip as a starting point to extend to a position of the through hole around the display area along the second area, so as to be connected to the input wiring portion of the through-hole crack detecting line; and one end of the output portion is connected to the output wiring portion of the through-hole crack detecting line, and the output portion takes a position connected to the output wiring portion as a starting point to extend to the first area around the display area along the second area, extend to the third area around the display area along the first area, extend to the position near the through hole around the display area along the third area, and extend back to the first area from the position near the through hole around the display area along the third area, so as to be connected to the other pin of the driving chip.

Embodiments of the present disclosure further provide a display apparatus, including any of the above display panels.

BRIEF DESCRIPTION OF THE DRAWINGS

In order to illustrate technical solutions of the embodiments of the present disclosure more clearly, accompanying drawings used in the embodiments of the present disclosure will be introduced below briefly. Apparently, the accompanying drawings introduced below are only some embodiments of the present disclosure, and those skilled in the art can obtain other drawings according to these accompanying drawings without inventive efforts.

DETAILED DESCRIPTION OF THE EMBODIMENTS

Figure 1:
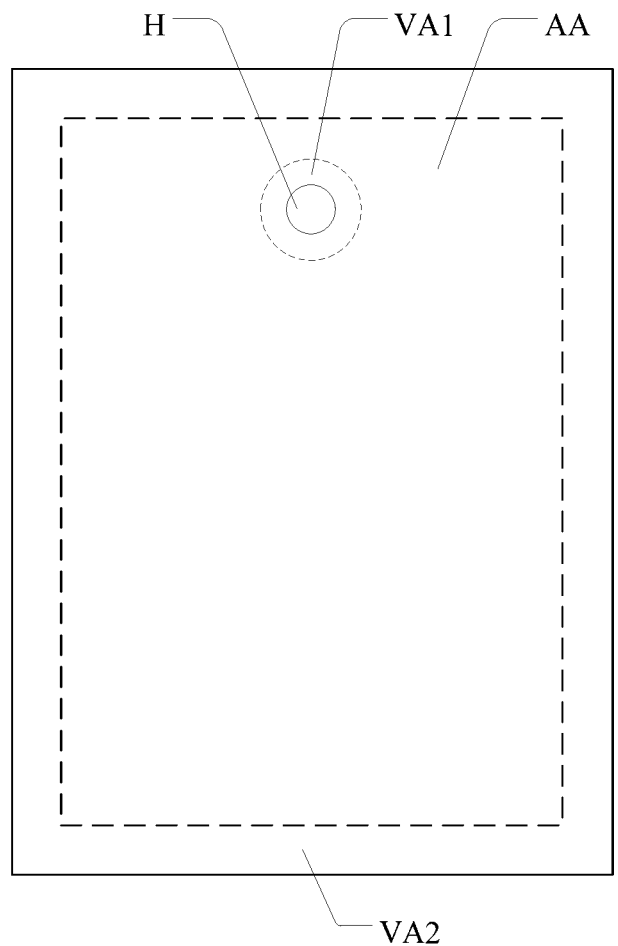
FIG. 1 is a first schematic diagram of a plane structure of a display panel provided by an embodiment of the present disclosure.

In order to make the above objects, features and advantages of the present disclosure more clearly understood, the present disclosure will be further described below with reference to accompanying drawings and embodiments. However, the illustrated embodiments may be implemented in various forms and should not be construed as being limited to the embodiments set forth herein. To the contrary, these embodiments are provided so that the present disclosure will be more thorough and complete, and the concept of the illustrated embodiments is fully conveyed to those skilled in the art. The same reference numerals in the accompanying drawings denote the same or similar structures, and thus their repeated descriptions will be omitted. The words expressing position and direction described in the present disclosure are all described by taking the accompanying drawings as an example, but changes may also be made as required, and the made changes are all contained in the protection scope of the present disclosure. The accompanying drawings of the present disclosure are only used to illustrate a relative positional relationship and do not represent actual scales.

FIG. 1 is a first schematic diagram of a plane structure of a display panel provided by an embodiment of the present disclosure.

Referring to FIG. 1, the display panel includes: a display area AA, used for image display. The display area AA includes at least one through hole H. The through hole H penetrates through the display panel and is used to arrange a camera, an optical detection component, and other devices at a position of the through hole H, so as to realize full screen display.

The display panel further includes an annular non-display area VAT between the display area AA and the through hole H, and a peripheral non-display area VA2 at a periphery of the display area AA. After digging a hole in a screen of the display panel, cracks may appear at a dug hole position. In order to prevent the above cracks from entering the display area AA and affecting the image display, a blocking component is arranged in the annular non-display area VA1.

Figure 2:
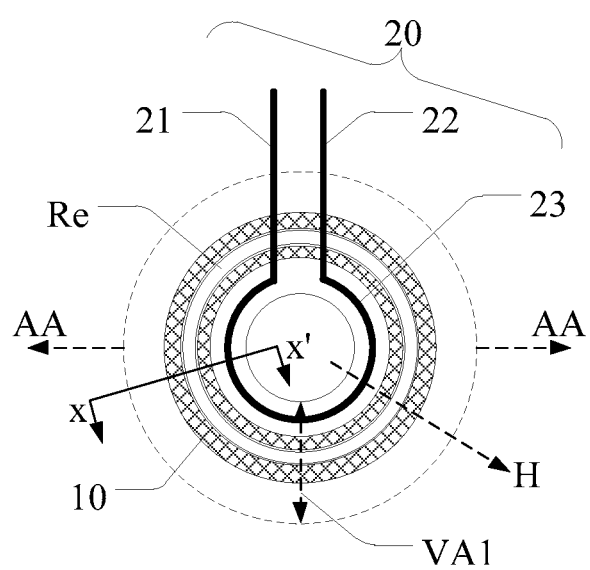
FIG. 2 is a first schematic diagram of a plane structure of a through hole position provided by an embodiment of the present disclosure.

FIG. 2 is a first schematic diagram of a plane structure of a through hole position provided by an embodiment of the present disclosure.

Referring to FIG. 2, the annular non-display area VA1 includes at least two annular blocking dams 10. All the annular blocking dams 10 are mutually nested. Adjacent annular blocking dams 10 are spaced at a predetermined distance. The annular blocking dam on an innermost side encloses the through hole H.

A through-hole crack detecting line 20 is configured to perform crack detection on an edge of the through hole H. The through-hole crack detecting line 20 includes: an input wiring portion 21, an output wiring portion 22 and a winding portion 23. The input wiring portion 21 and the output wiring portion 22 are connected through the winding portion 23. The input wiring portion 21 and the output wiring portion 22 extend to the display area AA, and the winding portion 23 is arranged around the edge of the through hole H.

The through-hole crack detecting line 20 is arranged near the edge of through hole H. If cracks are generated in a cutting process of the through hole H, extension of the cracks towards the display area AA will cause the through-hole crack detecting line 20 to tear, resulting in changes in its electrical parameters. By detecting the electrical parameters of the through-hole crack detecting line 20, it may be determined whether cracks are generated at a position where through hole H is located.

In a manufacturing process of the display panel, blocking dams are arranged at the edge of the display panel. Correspondingly, at least two annular blocking dams 10 are also arranged in the annular non-display area VA1. The annular blocking dams are not only used to block the cracks from further extending towards the display area AA, but also to increase a barrier path for water and oxygen, thereby ensuring performance of an organic light-emitting layer and a functional layer in the display panel. The annular blocking dams 10 and the through-hole crack detecting line 20 are all manufactured in the manufacturing process of the display panel.

Figure 3:
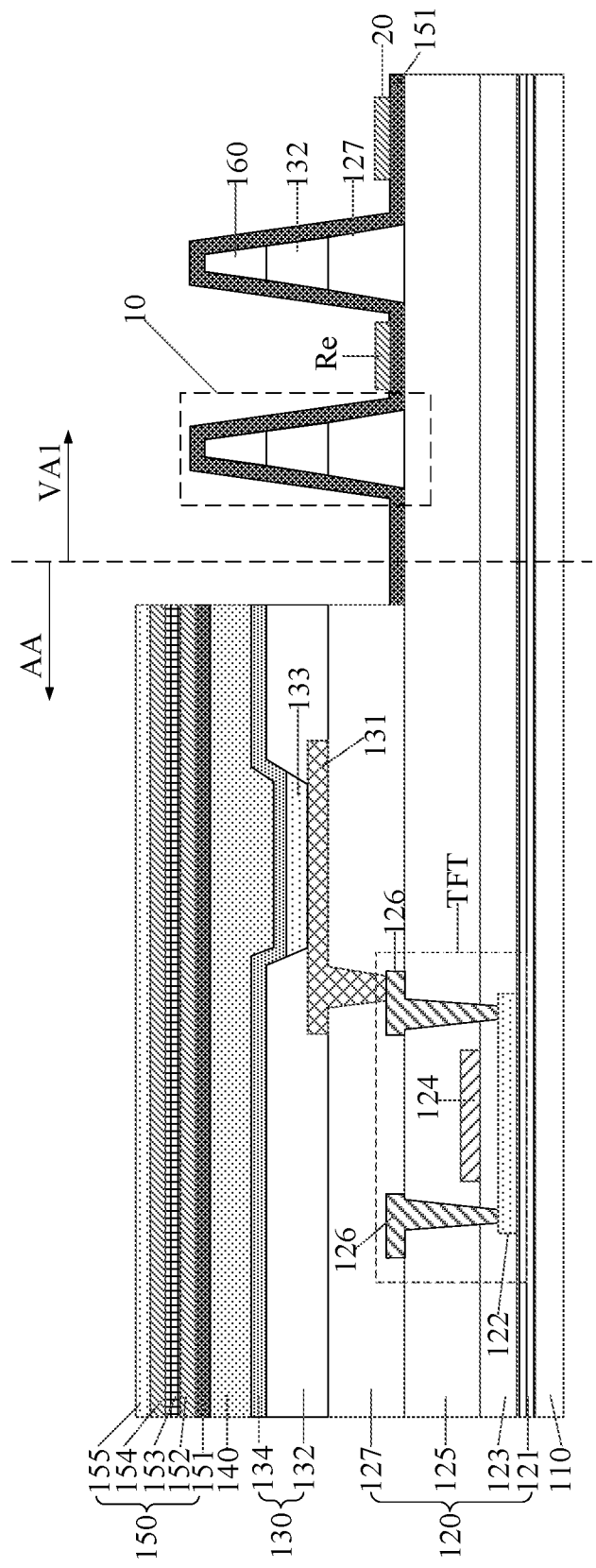
FIG. 3 is a schematic diagram of a section structure of a display panel along an x-x' direction in FIG. 2.

FIG. 3 is a schematic diagram of a section structure of a display panel along an x-x' direction in FIG. 2.

Referring to FIG. 3, the display panel includes:

a base substrate 110, having functions of supporting and carrying;
a driving circuit layer 120, located on the base substrate, and used to provide a driving signal for a pixel unit; and
an organic light-emitting diode device layer 130, located on one side of the driving circuit layer 120 facing away from the base substrate 110.

The above display panel provided by the embodiments of the present disclosure may be an organic light-emitting diode display panel. In the organic light-emitting diode display panel, a light-emitting device serving as the pixel unit is an organic light-emitting diode device.

The display panel further includes an encapsulation layer 140 located on one side of the organic light-emitting diode device layer 130 facing away from the driving circuit layer 120. The encapsulation layer 140 has a structure of an inorganic layer and an organic layer which are alternatively stacked, and is used for encapsulating the organic light-emitting diode device, and blocking the water and oxygen from entering into the organic light-emitting diode device.

The display panel further includes a touch control functional layer 150 on one side of the encapsulation layer 140 facing away from the organic light-emitting diode device layer 130.

According to the embodiments of the present disclosure, a metal grid electrode is directly manufactured on the encapsulation layer 140 without the need for an external touch control device, thereby reducing an overall thickness of the display panel and making it suitable for a flexible display panel. A touch control display panel manufactured by using this technology does not have a problem of fitting tolerance, which can further reduce a bezel width.

Referring to FIG. 3, the driving circuit layer 120 includes a buffer layer 121, an active layer 122, a gate insulating layer 123, a gate metal layer 124, an interlayer insulating layer 125, a source-drain metal layer 126, and a planarization layer 127.

The buffer layer 121 is located on the base substrate 110. The buffer layer 121 may match a stress between the base substrate 110 and an upper film layer, and may also improve sealing performance of the display panel. The buffer layer 121 may be manufactured through an inorganic material, which is not limited here.

The active layer 122 is located on one side of the buffer layer 121 facing away from the base substrate 110. The active layer 122 is a functional film layer for manufacturing a thin film transistor, and the active layer 122 is of a preset pattern. The active layer 122 includes a source area and a drain area formed by doping N-type ions or P-type ions, and an area between the source area and the drain area is a channel area that is not doped.

The gate insulating layer 123 is located on one side of the active layer 122 facing away from the buffer layer 121. The gate insulating layer 123 is used to insulate a metal layer above from the active layer 122. A material of the gate insulating layer 123 may be silicon oxide, silicon nitride or the like, which is not limited here.

The gate metal layer 124 is located on one side of the gate insulating layer 123 facing away from the active layer 122. The gate metal layer 124 is of a pattern including a gate electrode G and a gate line. The gate metal layer 124 may be a single metal layer, or may adopt a lamination structure of multiple metal layers, which is not limited here.

The interlayer insulating layer 125 is located on one side of the gate metal layer 124 facing away from the gate insulating layer 123. The interlayer insulating layer 125 is used to insulate a metal layer above from the gate metal layer 124. A material of the interlayer insulating layer 125 may be silicon oxide, silicon nitride or the like, which is not limited here.

The source-drain metal layer 126 is located on one side of the interlayer insulating layer 125 facing away from the gate metal layer 124. The source-drain metal layer 126 is of a pattern including a source electrode, a drain electrode and a data line. The source-drain metal layer 126 may be a single metal layer, or may adopt a lamination structure of multiple metal layers, which is not limited here.

The active layer, the gate electrode, the source electrode and the drain electrode constitute a thin film transistor structure.

The planarization layer 127 is located on one side of the source-drain metal layer 126 facing away from the interlayer insulating layer 125. The planarization layer 127 is used to insulate the source-drain metal layer 126, and to planarize a surface of the film layer, which is beneficial to forming other devices on the planarization layer 127. The planarization layer 127 may be manufactured through materials such as silicon oxide and silicon nitride, which is not limited here. A surface of the planarization layer 127 is provided with a via hole exposing the drain electrode.

After the above driving circuit layer 120 is formed on the base substrate 110, the organic light-emitting diode device layer 130 is manufactured on the driving circuit layer 120. The organic light-emitting diode device layer 130 includes: a first electrode layer 131, a pixel defining layer 132, a light-emitting layer 133, and a second electrode layer 134.

The first electrode layer 131 is located on one side of the planarization layer 127 facing away from the source-drain metal layer 126. The first electrode layer 131 includes a plurality of mutually discrete first electrodes. Each first electrode is electrically connected with the drain electrode of the lower thin film transistor through the via hole in the planarization layer 127, to transmit a driving signal to the first electrode. A material of the first electrode layer 131 may be a transparent conductive material such as indium tin oxide, which is not limited here.

The pixel defining layer 132 is located on one side of the planarization layer 127 facing away from the source-drain metal layer 126 and located at spacing positions between any two of the first electrodes. The pixel defining layer 132 is used to separate areas where the first electrodes are located, and has a larger thickness than the first electrode layer 131 and other organic functional film layers.

The supporting portion (not shown in the figure) is located on one side of the pixel defining layer 132 facing away from the planarization layer 127. The supporting portion is used to support other components above in the display panel.

The light-emitting layer 133 is located on one side of the first electrodes (131) facing away from the planarization layer 127. The light-emitting layers 133 formed on the different first electrodes may adopt the same or different materials. In the display panel provided by the embodiments of the present disclosure, the light-emitting layers 133 may adopt organic light-emitting materials that emit different colors, and the light-emitting layers may be only formed on the corresponding first electrodes. Alternatively, the light-emitting layer 133 may also adopt an organic light-emitting material that emits white light, the light-emitting layer is arranged in the whole layer, and then a color film substrate is arranged to realize the emission of light of the different colors.

The second electrode layer 134 is located on one side of the light-emitting layer 133, the pixel defining layer 132, and the supporting portion facing away from the planarization layer 127. The second electrode layer 134 is disposed in the whole layer, and a material of the second electrode layer 134 may be a conductive material such as metallic silver, which is not limited here.

When a voltage is applied to the first electrode layer 131 and the second electrode layer 134, holes and electrons are compounded into excitons in the light-emitting layer to excite the light-emitting material in the light-emitting layer 133 to emit the light.

After forming the above organic light-emitting diode device layer 130 on the driving circuit layer 120 of the base substrate, the encapsulation layer 140 is formed on the surface of the organic light-emitting diode device layer 130. An encapsulation layer closest to the organic light-emitting diode device layer 130 is an inorganic layer, which can play a role in blocking the water and oxygen from entering the organic light-emitting diode device layer 130. Adding an organic layer between the inorganic layers can alleviate stress.

After forming the encapsulation layer 140, the touch control functional layer 150 is manufactured on the encapsulation layer 140. The touch control functional layer 150 includes: a touch control blocking layer 151, a first touch control electrode layer 152, a insulating layer, a second touch control electrode layer 154, and a protection layer 155.

The touch control blocking layer 151 is located on a surface of one side of the encapsulation layer 140 facing away from the organic light-emitting diode device layer 130. The touch control blocking layer 151 plays a role in blocking between the organic light-emitting diode device layer and a touch control electrode. The touch control blocking layer 151 may be manufactured through an inorganic material, which is not limited here.

The first touch control electrode layer 152 is located on a surface of one side of the touch control blocking layer 151 facing away from the encapsulation layer 140. The insulating layer 153 is located on a surface of one side of the first touch control electrode layer 152 facing away from the touch control blocking layer 151. The second touch control electrode layer 154 is located on a surface of one side of the insulating layer 153 facing away from the first touch control electrode layer 152. The first touch control electrode layer 152 and the second touch control electrode layer 154 are metal layers used to achieve the touch control functional, and have a grid like pattern. The insulating layer 153 is used between the two metal layers for insulation.

The protection layer 155 is located on a surface of one side of the second touch control electrode layer 154 facing away from the insulating layer 153. The protection layer 155 plays a role in insulated protection of the touch control electrode layer. The protection layer may be manufactured through an organic material, which is not limited here.

The above is a basic structure of the display panel provided by the embodiments of the present disclosure. The annular blocking dams 10 in the annular non-display area VA1 include a plurality of stacked film layers. All the film layers included by the annular blocking dams 10 are arranged on the same layer as at least one of the planarization layer 127, the pixel defining layer 132, or the supporting portion. That is to say, in a process of manufacturing the driving circuit layer 120 and the organic light-emitting diode device layer 130 of the display panel, the annular blocking dams 10 are formed by using the same composition process as at least one of the planarization layer 127, the pixel defining layer 132, or the supporting portion.

The through-hole crack detecting line 20 is arranged on the same layer as one metal layer in the touch control functional layer 150. Optionally, the through-hole crack detecting line 20 is arranged on the same layer as the first touch control electrode layer 152 or the second touch control electrode layer 154, and is formed by using the same composition process as the first touch control electrode layer 152 or the second touch control electrode layer 154.

It can be seen that the through-hole crack detecting line 20 is manufactured after the annular blocking dams 10 are manufactured, and the annular blocking dams 10 have a larger height, so a depth between the adjacent annular blocking dams 10 is larger. In this case, when the metal layer (the first touch control electrode layer or the second touch control electrode layer) between the adjacent annular blocking dams 10 is etched during manufacturing the touch control functional layer, photoresist covering the metal layer cannot be fully exposed, resulting in the residual metal layer between the annular blocking dams 10. For details, please refer to residual metal Re in FIG. 2 and FIG. 3. Referring to FIG. 2, the through-hole crack detecting line 20 is formed by using the same composition process as the metal layer in the touch control functional layer. If there is the residual metal layer between the annular blocking dams 10, the input wiring portion 21 and the output wiring portion 22 of the through-hole crack detecting line may be electrically connected to the residual metal Re, resulting in a short circuit of the through-hole crack detecting line 20 during signal detection and failure to perform crack detection.

Figure 4:
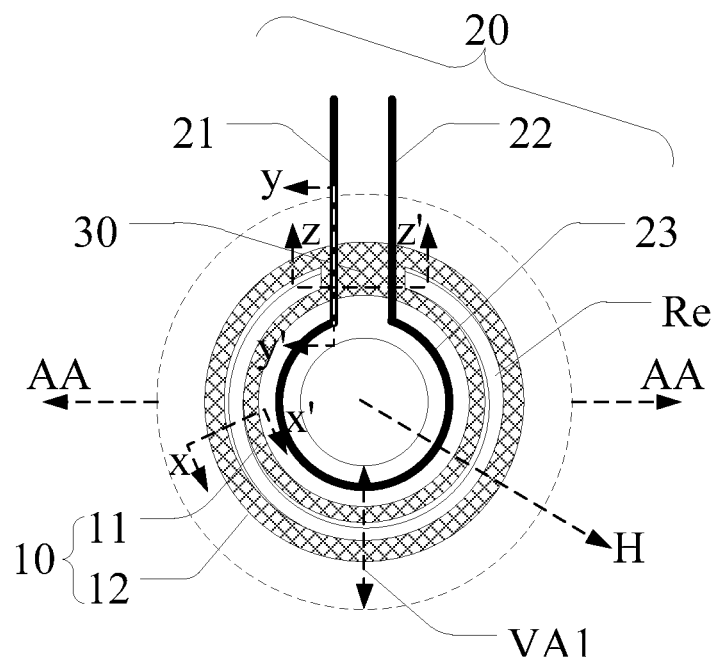
FIG. 4 is a second schematic diagram of a plane structure of a through hole position provided by an embodiment of the present disclosure.

FIG. 4 is a second schematic diagram of a plane structure of a through hole position provided by an embodiment of the present disclosure.

Referring to FIG. 4, in order to avoid the above problem, a connecting portion is arranged between the adjacent annular blocking dams 10. The connecting portion 30 is used to connect some areas of the annular blocking dams 10, thereby playing a role in blocking the through-hole crack detecting line 20 so as to prevent short circuit of the through-hole crack detecting line.

An arrangement mode of the connecting portion 30 and the through-hole crack detecting line 20 in the embodiments of the present disclosure will be illustrated in detail below by taking an implementation of including two annular blocking dams 10 in the annular non-display area VA1 as an example.

Referring to FIG. 4, the annular non-display area VA1 includes a first annular blocking dam 11 and a second annular blocking dam 12.

The first annular blocking dam 11 encloses the through hole H. The second annular blocking dam 12 encloses the first annular blocking dam 11. The connecting portion 30 is located between the first annular blocking dam 11 and the second annular blocking dam 12 and connects some areas of the first annular blocking dam 11 and the second annular blocking dam 12.

Optionally, referring to FIG. 4, the annular non-display area VA1 includes only one connecting portion 30. The input wiring portion 21 and the output wiring portion 22 extend from the display area AA into the first annular blocking dam 11. Orthographic projections of both the input wiring portion 21 and the output wiring portion 22 in the annular non-display area VA1 have overlapping areas with an orthographic projection of the connecting portion 30 in the annular non-display area VA1. The winding portion 23 is located in the first annular blocking dam 11, and surrounds the through hole H by taking an end of the input wiring portion 21 located in the first annular blocking dam 11 as a starting point and taking an end of the output wiring portion 22 located in the first annular blocking dam 11 as an end point. The input wiring portion 21 and the output wiring portion 22 are spaced at a predetermined distance.

According to embodiments of the present disclosure, one connecting portion 30 is arranged between the first annular blocking dam 11 and the second annular blocking dam 12 corresponding to the input wiring portion 21 and the output wiring portion 22. Therefore, the input wiring portion 21 and the output wiring portion 22 of the through-hole crack detecting line may extend from the display area AA into the first annular blocking dam 11 through the connecting portion 30. In this case, the through-hole crack detecting line does not make contact with the residual metal Re between the first annular blocking dam 11 and the second annular blocking dam 12, thereby avoiding a problem of the short circuit generated in the through-hole crack detecting line and ensuring its detection performance.

Figure 5A:
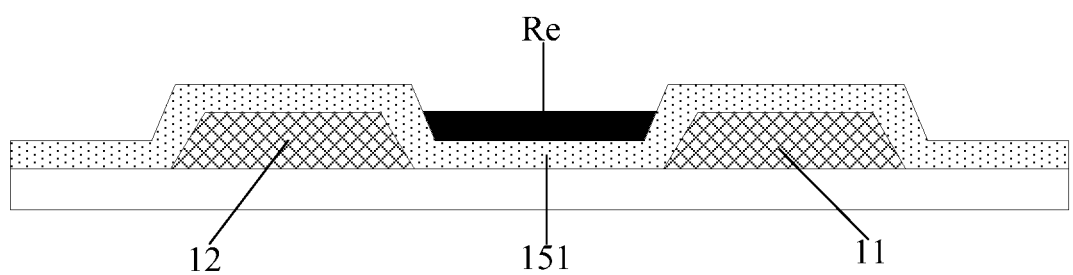
FIG. 5A is a schematic diagram of a section structure of a through hole position along an x-x' direction in FIG. 4.

FIG. 5A is a schematic diagram of a section structure of a through hole position along an x-x' direction in FIG. 4.

Referring to FIG. 5A, the touch control blocking layers 151 is on the surfaces of the first annular blocking dam 11 and the second annular blocking dam 12, while there is the residual metal Re between the first annular blocking dam 11 and the second annular blocking dam 12.

Figure 5B:
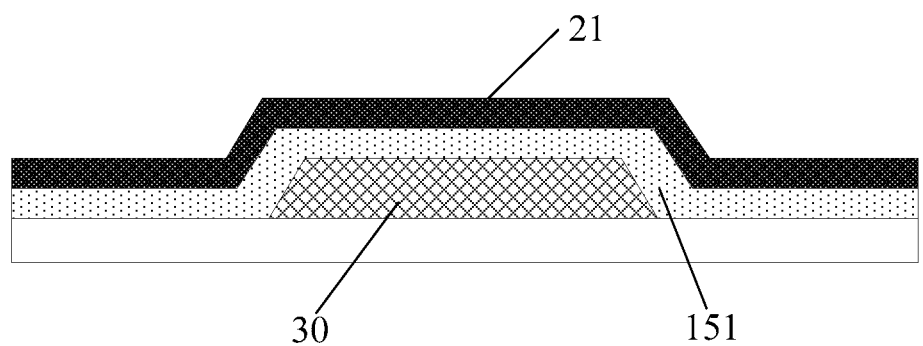
FIG. 5B is a schematic diagram of a section structure of a through hole position along a y-y' direction in FIG. 4.

FIG. 5B is a schematic diagram of a section structure of a through hole position along a y-y' direction in FIG. 4.

Referring to FIG. 5B, an upper part of the connecting portion 30 is covered with the touch control blocking layer 151, and the input wiring portion 21 of the through-hole crack detecting line extends from the interior of the first annular blocking dam to the display area through the connecting portion 30.

Figure 5C:
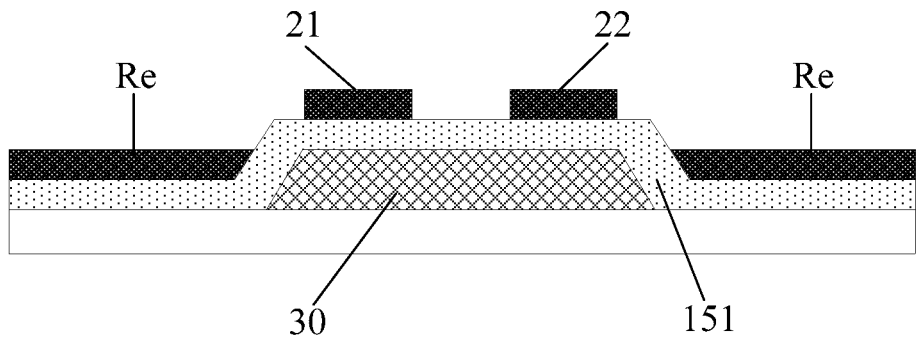
FIG. 5C is a schematic diagram of a section structure of a through hole position along a z-z' direction in FIG. 4.

FIG. 5C is a schematic diagram of a section structure of a through hole position along a z-z' direction in FIG. 4.

Referring to FIG. 5C, the upper part of the connecting portion 30 is covered with the touch control blocking layer 151. The input wiring portion 21 and the output wiring portion 22 of the through-hole crack detecting line both extend from the interior of the first annular blocking dam 11 to the display area through the connecting portion 30. The connecting portion 30 has the same height as the first annular blocking dam 11 and the second annular blocking dam 12, so the residual metal Re only forms at a valley area between the first annular blocking dam and the second annular blocking dam without forming on the connecting portion 30. Both the input wiring portion 21 and the output wiring portion 22 extend through the surface of the connecting portion 30 and do not make contact with the residual metal Re. The input wiring portion 21 and the output wiring portion 22 are spaced at the predetermined distance to avoid electrical connection between the two portions.

Figure 6:
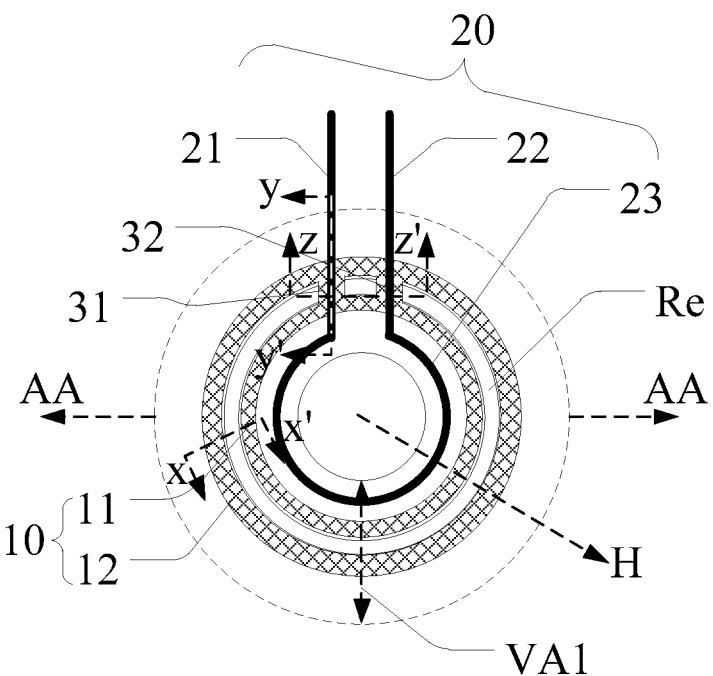
FIG. 6 is a third schematic diagram of a plane structure of a through hole position provided by an embodiment of the present disclosure.

FIG. 6 is a third schematic diagram of a plane structure of a through hole position provided by an embodiment of the present disclosure.

Optionally, referring to FIG. 6, the annular non-display area VA1 includes two connecting portions, namely, a first connecting portion 31 and a second connecting portion 32. The first connecting portion 31 and the second connecting portion 32 are located at the same side of the through hole H, and the first connecting portion 31 and the second connecting portion 32 are spaced at a predetermined distance. The input wiring portion 21 extends from the display area AA into the first annular blocking dam 11, and an orthographic projection of the input wiring portion 21 in the annular non-display area VA1 has an overlapping area with an orthographic projection of the first connecting portion 31 in the annular non-display area VA1. The output wiring portion 22 extends from the display area AA into the first annular blocking dam 11, and an orthographic projection of the output wiring portion 22 in the annular non-display area VA1 has an overlapping area with an orthographic projection of the second connecting portion 32 in the annular non-display area VA1. The winding portion 23 is located in the first annular blocking dam 11, and surrounds the through hole H by taking an end of the input wiring portion 21 located in the first annular blocking dam 11 as a starting point and taking an end of the output wiring portion 22 located in the first annular blocking dam 11 as an end point.

According to embodiments of the present disclosure, the first connecting portion 31 and the second connecting portion 32 are respectively arranged between the first annular blocking dam 11 and the second annular blocking dam 12 corresponding to the input wiring portion 21 and the output wiring portion 22. Therefore, the input wiring portion 21 of the through-hole crack detecting line may extend from the display area AA into the first annular blocking dam 11 through the first connecting portion 31, and the output wiring portion 22 may extend from the display area AA into the first annular blocking dam 11 through the second connecting portion 32. In this case, the through-hole crack detecting line does not make contact with the residual metal Re between the first annular blocking dam 11 and the second annular blocking dam 12, thereby avoiding a problem of the short circuit generated in the through-hole crack detecting line and ensuring its detection performance.

A schematic diagram of the section structure of the through hole position along the x-x' direction in FIG. 6 is the same as that in FIG. 5A. The touch control blocking layers 151 is on the surfaces of the first annular blocking dam 11 and the second annular blocking dam 12, while there is the residual metal Re between the first annular blocking dam 11 and the second annular blocking dam 12.

A schematic diagram of the section structure of the through hole position along the y-y' direction in FIG. 6 is the same as that in FIG. 5B. An upper part of the first connecting portion (31) is covered with the touch control blocking layer 151, and the input wiring portion 21 of the through-hole crack detecting line extends from the interior of the first annular blocking dam to the display area through the first connecting portion (31).

Figure 7:
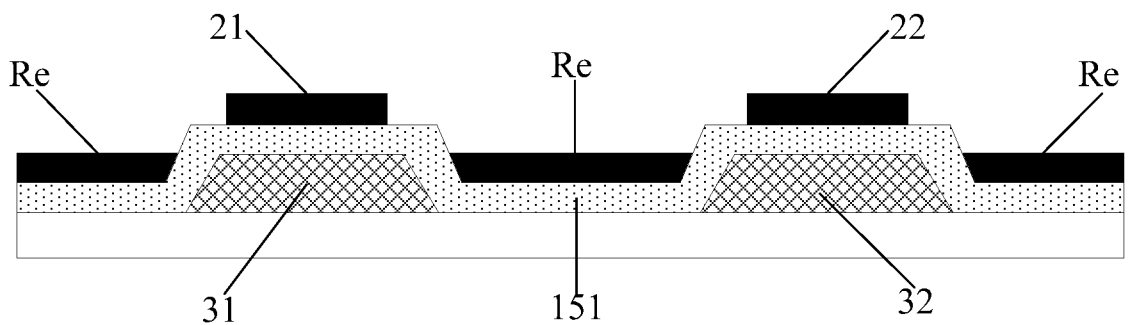
FIG. 7 is a schematic diagram of a section structure of a through hole position along a z-z' direction in FIG. 6.

FIG. 7 is a schematic diagram of a section structure of a through hole position along a z-z' direction in FIG. 6.

Referring to FIG. 7, upper parts of the first connecting portion 31 and the second connecting portion 32 are covered with the touch control blocking layers 151. The input wiring portion 21 of the through-hole crack detecting line extends from the display area into the first annular blocking dam through the first connecting portion 31, and the output wiring portion 22 extends from the interior of the first annular blocking dam to the display area through the second connecting portion 32.

The first connecting portion 31 and the second connecting portion 32 have the same height as the first annular blocking dam 11 and the second annular blocking dam 12, so the residual metal Re only forms at the valley area between the first annular blocking dam and the second annular blocking dam without forming on the first connecting portion 31 and the second connecting portion 32. The input wiring portion 21 extends through a surface of the first connecting portion 31, and the output wiring portion 22 extends through a surface of the second connecting portion 32 and do not make contact with the residual metal Re, so as to avoid the problem of the short circuit of the through-hole crack detecting line.

Figure 8:
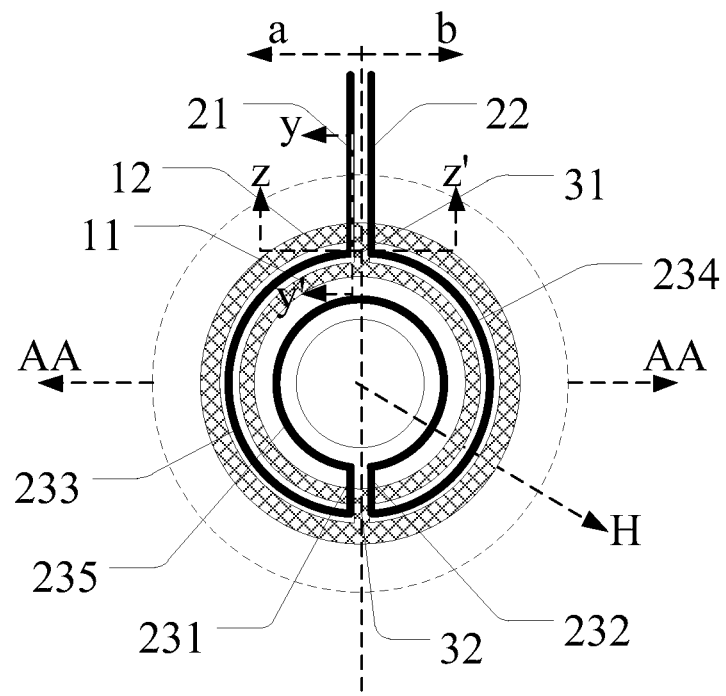
FIG. 8 is a fourth schematic diagram of a plane structure of a through hole position provided by an embodiment of the present disclosure.

FIG. 8 is a fourth schematic diagram of a plane structure of a through hole position provided by an embodiment of the present disclosure.

Optionally, referring to FIG. 8, the annular non-display area includes two connecting portions, namely a first connecting portion 31 and a second connecting portion 32. The first connecting portion 31 is located on one side of the through hole H, and the second connecting portion 32 is located on an opposite side of the through hole H. The first annular blocking dam 11 and the second annular blocking dam 12 are cut into a first side 'a' and a second side 'b' which are oppositely arranged by the first connecting portion 31 and the second connecting portion 32.

The input wiring portion 21 extends from the display area AA to a position between the first annular blocking dam 11 and the second annular blocking dam 12 on the first side 'a'. An orthographic projection of the input wiring portion 21 in the annular non-display area has an overlapping area with an orthographic projection of the second annular blocking dam 12 in the annular non-display area. The orthographic projection of the input wiring portion 21 in the annular non-display area and an orthographic projection of the first connecting portion 31 in the annular non-display area do not overlap, and the input wiring portion 21 is located adjacent to the first side 'a' of the first connecting portion 31.

The output wiring portion 22 extends from the display area AA to the position between the first annular blocking dam 11 and the second annular blocking dam 12 at the second side 'b'. An orthographic projection of the output wiring portion 22 in the annular non-display area has an overlapping area with the orthographic projection of the second annular blocking dam 12 in the annular non-display area. The orthographic projection of the output wiring portion 22 in the annular non-display area and an orthographic projection of the first connecting portion 31 in the annular non-display area do not overlap, and the output wiring portion 22 is located adjacent to the second side 'b' of the first connecting portion 31.

The winding portion includes a first connecting wire portion 231, a second connecting wire portion 232, a first winding portion 233, a second winding portion 234, and a third winding portion 235.

The first connecting wire portion 231 extends from the position between the first annular blocking dam 11 and the second annular blocking dam 12 into the first annular blocking dam 11 at the first side 'a'. An orthographic projection of the first connecting wire portion 231 in the annular non-display area has an overlapping area with an orthographic projection of the first annular blocking dam 11 in the annular non-display area. The orthographic projection of the first connecting wire portion 231 in the annular non-display area and an orthographic projection of the second connecting portion 32 in the annular non-display area do not overlap. The first connecting wire portion 231 is located adjacent to the first side 'a' of the second connecting portion 32.

The second connecting wire portion 232 extends from the position between the first annular blocking dam 11 and the second annular blocking dam 12 into the first annular blocking dam 11 at the second side 'b'. An orthographic projection of the second connecting wire portion 232 in the annular non-display area has an overlapping area with the orthographic projection of the first annular blocking dam 11 in the annular non-display area. The orthographic projection of the second connecting wire portion 232 in the annular non-display area and the orthographic projection of the second connecting portion 32 in the annular non-display area do not overlap. The second connecting wire portion 232 is located adjacent to the second side 'b' of the second connecting portion 32.

The first winding portion 233 is located between the first annular blocking dam 11 and the second annular blocking dam 12 at the first side 'a', and connects the input wiring portion 21 with the first connecting wire portion 231. The second winding portion 234 is located between the first annular blocking dam 11 and the second annular blocking dam 12 at the second side 'b', and connects the output wiring portion 22 with the second connecting wire portion 232. The third winding portion 235 is located in the first annular blocking dam 11, and surrounds the through hole H by taking an end of the first connecting wire portion 231 located in the first annular blocking dam 11 as a starting point and taking an end of the second connecting wire portion 232 located in the first annular blocking dam 11 as an end point.

According to embodiments of the present disclosure, the first connecting portion 31 and the second connecting portion 32 are arranged between the first annular blocking dam 11 and the second annular blocking dam 12 on two opposite sides of the through hole H, thereby dividing an area between the first annular blocking dam 11 and the second annular blocking dam 12 into two independent areas that are not connected to each other. When forming the through-hole crack detecting line, the area between the first annular blocking dam 11 and the second annular blocking dam 12 may be utilized to form a pattern between the first annular blocking dam 11 and the second annular blocking dam 12. The through-hole crack detecting line is wound by using the first annular blocking dam 11 and the second annular blocking dam 12, as well as the first connecting portion 31 and the second connecting portion 32, to avoid the problem of the short circuit of the through-hole crack detecting line.

The order of the through-hole crack detecting line from input to output is as follows: the input wiring portion 21 extends from the display area AA to the position between the first annular blocking dam 11 and the second annular blocking dam 12 at the first side 'a' of the first connecting portion 31; then extends along the position between the first annular blocking dam 11 and the second annular blocking dam 12 at the first side 'a' to the second connecting portion 32, to form the first winding portion 233; then extends from the position between the first annular blocking dam 11 and the second annular blocking dam 12 at the first side 'a' of the second connecting portion 32 into the first annular blocking dam 11, to form the first connecting wire portion 231; then extends around the edge of the through hole H to form the third winding portion 235; then extends from the interior of the first annular blocking dam 11 at the second side 'b' to the position between the first annular blocking dam 11 and the second annular blocking dam 12 at the second side 'b' of the second connecting portion 32, to form the second connecting wire portion 232; then extends along the position between the first annular blocking dam 11 and the second annular blocking dam 12 at the second side 'b' to the first connecting portion 31, to form the second winding portion 234; and finally extends from the position between the first annular blocking dam 11 and the second annular blocking dam 12 at the second side 'b' of the first connecting portion 31 into the display area AA, to form the output wiring portion 22.

Figure 9A:
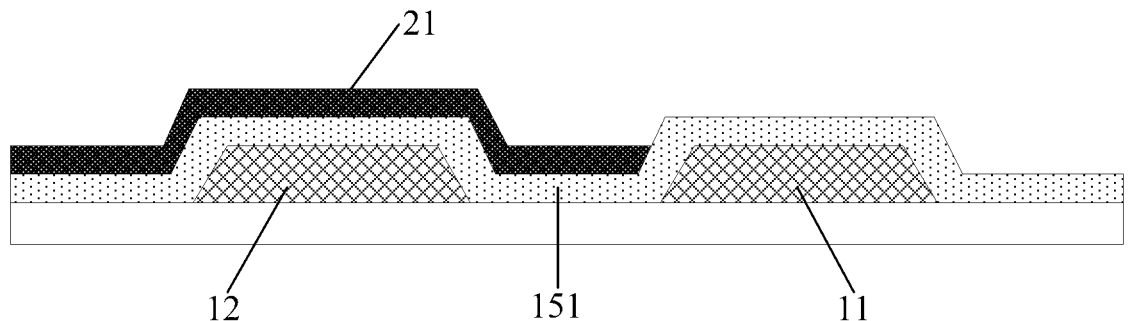
FIG. 9A is a schematic diagram of a section structure of a through hole position along a y-y' direction in FIG. 8.

FIG. 9A is a schematic diagram of a section structure of a through hole position along a y-y' direction in FIG. 8.

Referring to FIG. 9A, the first annular blocking dam 11 and the second annular blocking dam 12 are covered by the touch control blocking layer 151. The input wiring portion 21 extends from the display area to the position between the first annular blocking dam 11 and the second annular blocking dam 12 through the second annular blocking dam 12. A pattern of the through-hole crack detecting line is also formed between the first annular blocking dam 11 and the second annular blocking dam 12 by using the area between the first annular blocking dam 11 and the second annular blocking dam 12.

Figure 9B:
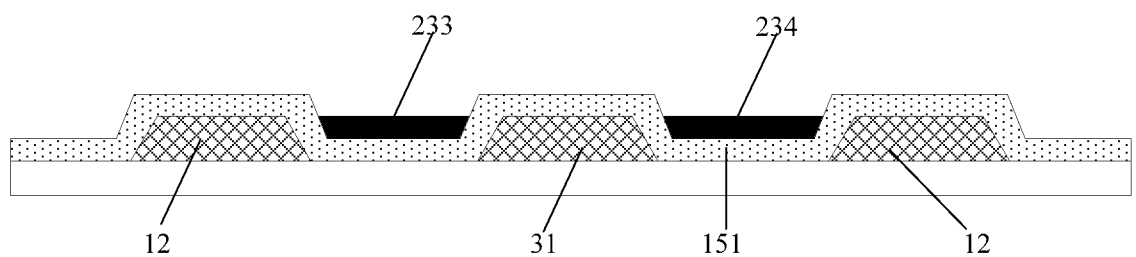
FIG. 9B is a schematic diagram of a section structure of a through hole position along a z-z' direction in FIG. 8.

FIG. 9B is a schematic diagram of a section structure of a through hole position along a z-z' direction in FIG. 8.

Referring to FIG. 9B, the second annular blocking dam 12 and the first connecting portion 31 are covered by the touch control blocking layer 151. The first winding portion 233 is located on the first side of the first connecting portion 31 (i.e. a left side of 31 in FIG. 9B), and the second winding portion 234 is located on the second side of the first connecting portion 31 (i.e. a right side of 31 in FIG. 9B).

The through-hole crack detecting line, by taking the first connecting portion 31 and the second connecting portion 32 as a boundary line, is wound between the first annular blocking dam 11 and the second annular blocking dam 12 at the first side, at the edge of the through hole H, and between the first annular blocking dam 11 and the second annular blocking dam 12 at the second side, so as to form the pattern by using the area between the first annular blocking dam 11 and the second annular blocking dam 12. There is no longer a need to etch the metal layer between the first annular blocking dam 11 and the second annular blocking dam 12, and there is no residual metal, thus avoiding the through-hole crack detecting line from making contact with the residual metal between the first annular blocking dam 11 and the second annular blocking dam 12.

A crack detecting method of the display panel provided by embodiments of the present disclosure is illustrated below.

Figure 10:
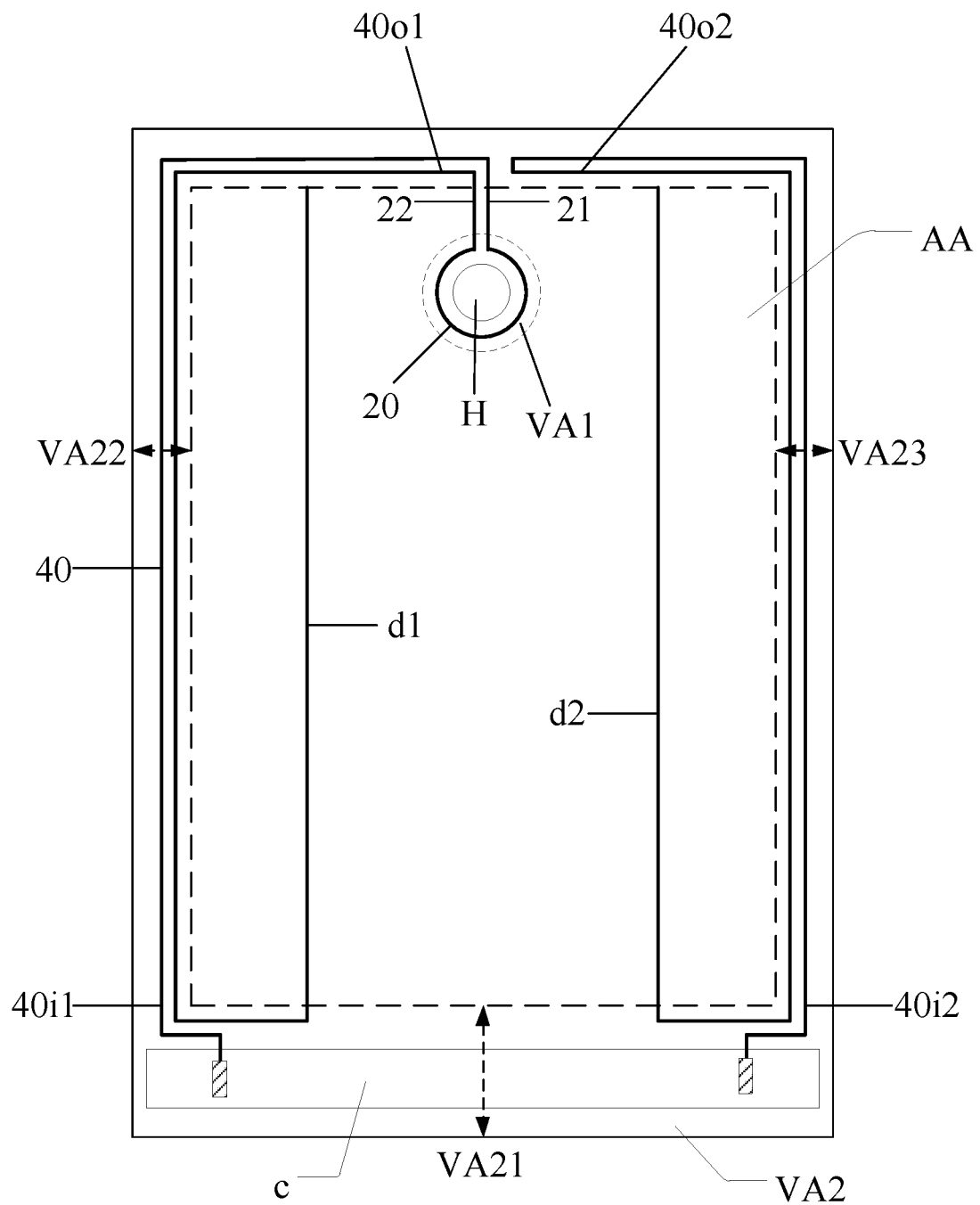
FIG. 10 is a second schematic diagram of a plane structure of a display panel provided by an embodiment of the present disclosure.

FIG. 10 is a second schematic diagram of a plane structure of a display panel provided by an embodiment of the present disclosure.

Referring to FIG. 10, a peripheral non-display area VA2 includes a driving chip 'c' located in the peripheral non-display area on one side of the display area AA. The driving chip 'c' is used to output a detecting signal to the crack detecting line in a crack detecting stage, and is used to output a data signal to the display panel in an image display stage.

The peripheral non-display area VA2 further includes a peripheral crack detecting line 40 configured to perform crack detecting on a peripheral edge of the display panel. The peripheral crack detecting line 40 is arranged around the edge of the display area AA. At least part of the peripheral crack detecting line 40 is connected to the through-hole crack detecting line 20, and at least one end of the peripheral crack detecting line 40 is connected to the driving chip 'c'.

As shown in FIG. 10, the through hole H in the display area AA may be located at one end far away from the driving chip 'c'. In such a case, the through-hole crack detecting line 20 cannot be directly connected to the driving chip 'c'. It is necessary to connect the through-hole crack detecting line 20 to the peripheral crack detecting line 40, and then connect the peripheral crack detecting line 40 to the driving chip 'c' to implement the crack detection of the display panel.

In order to conveniently illustrate an arrangement position of the peripheral crack detecting line 40, a peripheral non-display area at a side of the display area where the driving chip 'c' is located is a first area VA21, and peripheral non-display areas at two sides of the display area adjacent to the side of the display area where the driving chip 'c' is located are a second area VA22 and a third area VA23. A part of the peripheral crack detecting line 40 extends along the second area VA22, and another part of the peripheral crack detecting line 40 extends along the third area VA23, so that the peripheral crack detecting line 40 is arranged around the periphery of the display area.

The display area AA further includes: a plurality of pixel units (not shown in the figure), distributed in an array to form a plurality of pixel unit columns; and a plurality of data signal lines (d1 and d2), extending in a direction of the pixel unit column. One data signal line is connected to one column of pixel units.

Optionally, referring to FIG. 10, the peripheral crack detecting line 40 includes input portions (40i1 and 40i2) and output portions (40o1 and 40o2). Both the input portions and the output portions are detecting lines extending along the edge of the display area.

One end of the input portion 40i1 of the peripheral crack detecting line located in the second area VA22 is connected to a pin of the driving chip 'c'. The input portion 40i1 takes a position connected to the driving chip 'c' as a starting point to extend to a position of the through hole H around the display area along the second area VA22, so as to be connected to the input wiring portion 21 of the through-hole crack detecting line 20. One end of the output portion 40o1 of the peripheral crack detecting line in the second area VA22 is connected to the output wiring portion 22 of the through-hole crack detecting line 20. The output portion 40o1 takes a position connected to the output wiring portion 22 as a starting point to extend to the first area va21 around the display area along the second area VA22, so as to be connected to a data signal line d1 of the display area AA.

One end of the input portion 40i2 of the peripheral crack detecting line located in the third area VA23 is connected to another pin of the driving chip 'c'. The input portion 40i2 takes the position connected to the driving chip as the starting point to extend to a position near the through hole H around the display area along the third area VA23, so as to be connected to one end of the output portion 40o2 of the peripheral crack detecting line in the third area VA23. The output portion 40o2 of the peripheral crack detecting line in the third area VA23 takes a position connected to the input portion 40i2 as a starting point to extend to the first area VA21 around the display area along the third area VA23, so as to be connected to the other data signal line d2 of the display area.

The driving chip 'c' outputs a first detecting signal to the peripheral crack detecting line in the second area VA22. The first detecting signal is ultimately transmitted to the data signal line d1 in the display area through the peripheral crack detecting line in the second area VA22 and the through-hole crack detecting line 20. The first detecting signal may be a high-level signal that maintains a pixel unit connected to the data signal line d1 in a dark state. If there are no cracks generated at the edge of the second area VA22 and the edge of the through hole H of the display panel, the first detecting signal may be smoothly transmitted to the data signal line d1 of the display area through the peripheral crack detecting line in the second area VA22 and the through-hole crack detecting line 20, so that the pixel unit connected to the data signal line d1 presents the dark state, thus characterizing that there are no cracks generated at the edge of the second area VA22 and the edge of the through hole H of the display panel. If there is a crack generated at any position of the edge of the second area VA22 and the edge of the through hole H of the display panel, the crack detecting line at the position with the crack generated will be disconnected, the first detecting signal cannot be transmitted to the data signal line d1 of the display area, and a potential on the data signal line d1 is a low potential, so that the pixel units connected to the data signal line d1 are lighted up to form a bright line in the display area, thus characterizing that there is crack generated at the edge of the second area VA22 and/or the edge of the through hole H of the display panel.

Similarly, the driving chip 'c' outputs a second detecting signal to the peripheral crack detecting line in the third area VA23. The second detecting signal is ultimately transmitted to the data signal line d2 in the display area through the peripheral crack detecting line in the third area VA23. The second detecting signal may be a high-level signal that maintains a pixel unit connected to the data signal line d2 in a dark state. If there are no cracks at the edge of the third area VA23 of the display panel, the second detecting signal may be smoothly transmitted to the data signal line d2 of the display area through the peripheral crack detecting line in the third area VA23, so that the pixel unit connected to the data signal line d2 presents the dark state, thus characterizing that there are no cracks generated at the edge of the third area VA23. If there is a crack generated at any position of the edge of the third area VA23 of the display panel, the crack detecting line at the position with the crack generated will be disconnected, the second detecting signal cannot be transmitted to the data signal line d2, and a potential on the data signal line d2 is a low potential, so that the pixel units connected to the data signal line d2 are lighted up to form a bright line in the display area, thus characterizing that there is the crack generated at the edge of the third area VA23 of the display panel.

Figure 11:
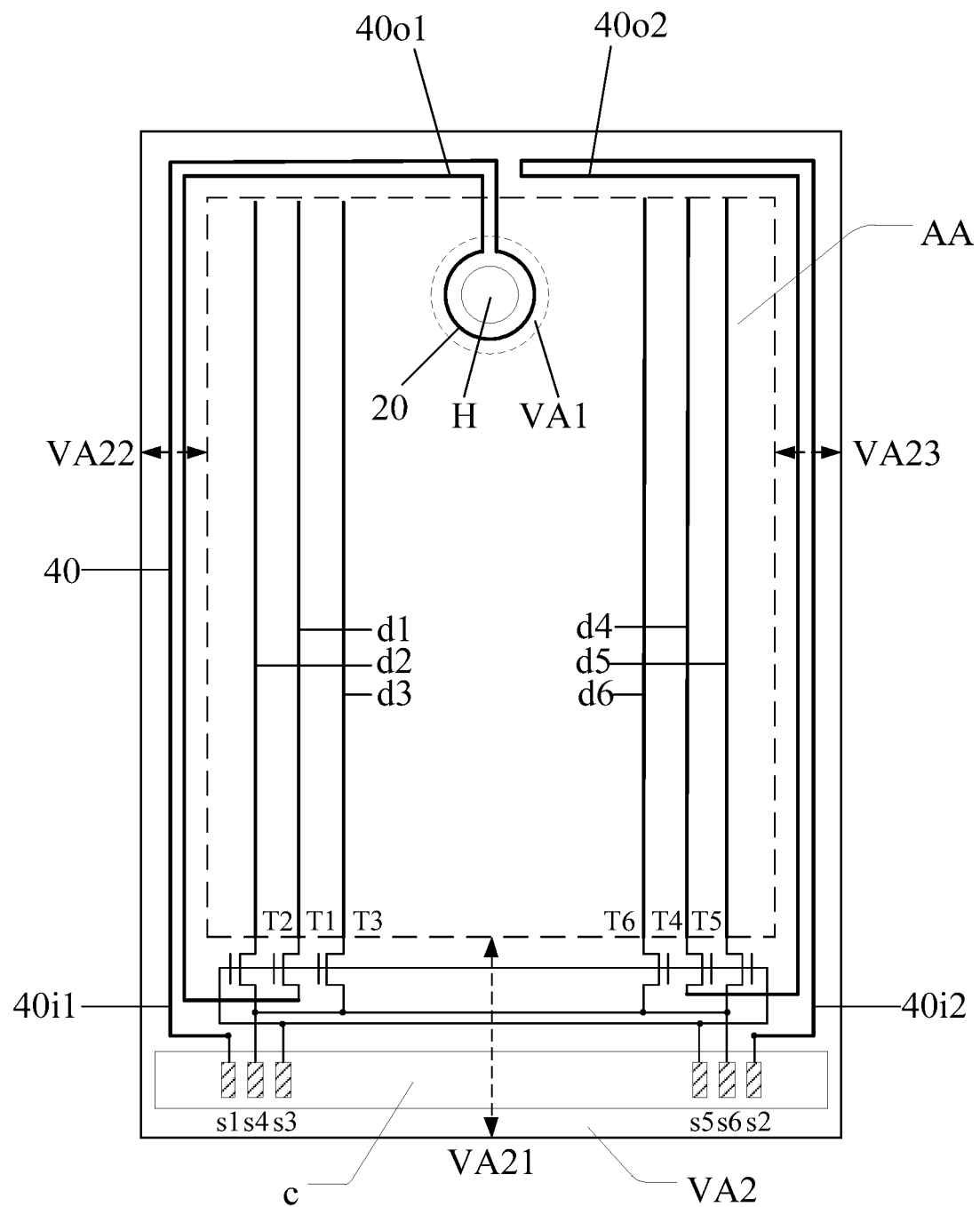
FIG. 11 is a third schematic diagram of a plane structure of a display panel provided by an embodiment of the present disclosure.

FIG. 11 is a third schematic diagram of a plane structure of a display panel provided by an embodiment of the present disclosure.

Optionally, referring to FIG. 11, the peripheral non-display area VA2 further includes: a first switching transistor T1, a second switching transistor T2, a third switching transistor T3, a fourth switching transistor T4, a fifth switching transistor T5, and a sixth switching transistor T6.

The input portion 40i1 of the peripheral crack detecting line in the second area VA22 is connected to a first output pin s1 of the driving chip 'c', and the input portion 40i2 of the peripheral crack detecting line in the third area VA23 is connected to a second output pin s2 of the driving chip 'c'.

The first switching transistor T1 is in the first area VA21. A control pole of the first switching transistor is connected to a third output pin s3 of the driving chip 'c', a first pole of the first switching transistor T1 is connected to the output portion 40o of the peripheral crack detecting line in the second area VA22, and a second pole of the first switching transistor T1 is connected to a first data signal line d1 in the display area.

The second switching transistor T2 is located in the first area VA21 and is adjacent to the first switching transistor T1. A control pole of the second switching transistor T2 is connected to the control pole of the first switching transistor T1, a first pole of the second switching transistor T2 is connected to a fourth output pin s4 of the driving chip 'c', and a second pole of the second switching transistor T2 is connected to a second data signal line d2 in the display area.

The third switching transistor T3 is located in the first area VA21 and located on one side of the first switching transistor T1 facing away from the second switching transistor T2. A control pole of the third switching transistor T3 is connected to the control pole of the first switching transistor T1, a first pole of the third switching transistor T3 is connected to the fourth output pin s4 of the driving chip 'c', and a second pole of the third switching transistor T3 is connected to a third data signal line d3 in the display area.

The second data signal line d2 and the third data signal line d3 are respectively located on two sides of the first data signal line d1.

The fourth switching transistor T4 is in the first area VA21. A control pole of the fourth switching transistor T4 is connected to a fifth output pin s5 of the driving chip 'c', a first pole of the fourth switching transistor T4 is connected to the output portion 40o2 of the peripheral crack detecting line in the third area VA23, and a second pole of the fourth switching transistor T4 is connected to a fourth data signal line d4 in the display area.

The fifth switching transistor T5 is located in the first area VA21 and is adjacent to the fourth switching transistor T4. A control pole of the fifth switching transistor T5 is connected to the control pole of the fourth switching transistor T4, a first pole of the fifth switching transistor T5 is connected to a sixth output pin s6 of the driving chip 'c', and a second pole of the fifth switching transistor T5 is connected to a fifth data signal line d5 in the display area.

The sixth switching transistor T6 is located in the first area VA21 and located on one side of the fourth switching transistor T4 facing away from the fifth switching transistor T5. A control pole of the sixth switching transistor T6 is connected to the control pole of the fourth switching transistor T4, a first pole of the sixth switching transistor T6 is connected to the sixth output pin s6 of the driving chip 'c', and a second pole of the sixth switching transistor T6 is connected to a sixth data signal line d6 in the display area.

The fifth data signal line d5 and the sixth data signal line d6 are respectively located on two sides of the fourth data signal line d4.

The first output pin s1 of the driving chip 'c' outputs the first detecting signal to the peripheral crack detecting line in the second area VA22, and the third output pin s3 of the driving chip 'c' outputs a first control signal to the control poles of the first switching transistor T1, the second switching transistor T2 and the third switching transistor T3, so that the first switching transistor T1, the second switching transistor T2 and the third switching transistor T3 are all turned on. The fourth output pin s4 of the driving chip 'c' outputs a first auxiliary detecting signal to the first poles of the second switching transistor T2 and the third switching transistor T3. It can be seen by observing FIG. 11 that the first detecting signal output by the first output pin s1 is ultimately transmitted to the data signal line d1 of the display area through the peripheral crack detecting line located in the second area VA22 and the through-hole crack detecting line 20. The first auxiliary detecting signal output by the fourth output pin s4 is transmitted to the data signal line d2 and the data signal line d3 in the display area through the second switching transistor T2 and the third switching transistor T3.

The above first detecting signal and first auxiliary detecting signal may be a high-level signal that maintains a pixel unit connected to the data signal line in a dark state. If there are no cracks generated at the edge of the second area VA22 and the edge of the through hole H of the display panel, the first detecting signal may be smoothly transmitted to the data signal line d1 of the display area through the peripheral crack detecting line in the second area VA22 and the through-hole crack detecting line 20, so that the pixel unit connected to the data signal line d1 presents the dark state. Further, the two columns of pixel units connected to the data signal line d2 and the data signal line d3 also present the dark state under the control of the first auxiliary detecting signal, so that a difference between display brightness of the pixel units connected to the data signal line d1 and display brightness of the two columns of pixel units connected to the data signal line d2 and the data signal line d3 on both sides of the data signal line d1 is within a threshold range, thus characterizing that there are no cracks generated at the edge of the second area VA22 and the edge of the through hole H of the display panel.

If there is a crack generated at any position of the edge of the second area VA22 and the edge of the through hole H of the display panel, the crack detecting line at the position with the crack generated will be disconnected, the first detecting signal cannot be transmitted to the data signal line d1 of the display area, and a potential on the data signal line d1 is a low potential, so that the pixel units connected to the data signal line d1 are lighted up to form a bright line in the display area. The two columns of pixel units connected to the data signal line d2 and the data signal line d3 present the dark state under the control of the first auxiliary detecting signal, so that the difference between the display brightness of the pixel units connected to the data signal line d1 and the display brightness of the two columns of pixel units connected to the data signal line d2 and the data signal line d3 on both sides of the data signal line d1 exceeds the threshold range, thus characterizing that there is crack generated at the edge of the second area VA22 and/or the edge of the through hole H of the display panel.

Similarly, the second output pin s2 of the driving chip 'c' outputs the second detecting signal to the peripheral crack detecting line in the third area VA23. Further, the fifth output pin s5 of the driving chip 'c' outputs a second control signal to the control poles of the fourth switching transistor T4, the fifth switching transistor T5, and the sixth switching transistor T6, so that the fourth switching transistor T4, the fifth switching transistor T5, and the sixth switching transistor T6 are all turned on. The sixth output pin s6 of the driving chip 'c' outputs a second auxiliary detecting signal to the first poles of the fifth switching transistor T5 and the sixth switching transistor T6. It can be seen by observing FIG. 11 that the second detecting signal output by the second output pin s2 is ultimately transmitted to the data signal line d4 of the display area through the peripheral crack detecting line in the third area VA23, and the second auxiliary detecting signal output by the sixth output pin s6 is transmitted to the data signal line d5 and the data signal line d6 in the display area through the fifth switching transistor T5 and the sixth switching transistor T6.

The above second detecting signal and second auxiliary detecting signal may be a high-level signal that maintains a pixel unit connected to the data signal line in a dark state. If there are no crack generated at the edge of the third area VA23 of the display panel, the second detecting signal may be smoothly transmitted to the data signal line d4 of the display area through the peripheral crack detecting line in the third area VA23, so that the pixel unit connected to the data signal line d4 presents the dark state, and the two columns of pixel units connected to the data signal line d5 and the data signal line d6 present the dark state under the control of the second auxiliary detecting signal, so that a difference between display brightness of the pixel units connected to the data signal line d4 and display brightness of the two columns of pixel units connected to the data signal line d5 and the data signal line d6 on both sides of the data signal line d4 is within the threshold range, thus characterizing that there are no crack generated at the edge of the third area VA23 of the display panel.

If there is a crack generated at any position of the edge of the third area VA23 of the display panel, the peripheral crack detecting line at the position with the crack generated will be disconnected, the second detecting signal cannot be transmitted to the data signal line d4 of the display area, and a potential on the data signal line d4 is a low potential, so that the pixel units connected to the data signal line d4 are lighted up to form a bright line in the display area. The two columns of pixel units connected to the data signal line d5 and the data signal line d6 still present the dark state under the control of the second auxiliary detecting signal, so that the difference between the display brightness of the pixel units connected to the data signal line d4 and the display brightness of the two columns of pixel units connected to the data signal line d5 and the data signal line d6 on both sides of the data signal line d4 exceeds the threshold range, thus characterizing that there is the crack generated at the edge of the third area VA23 of the display panel.

Figure 12:
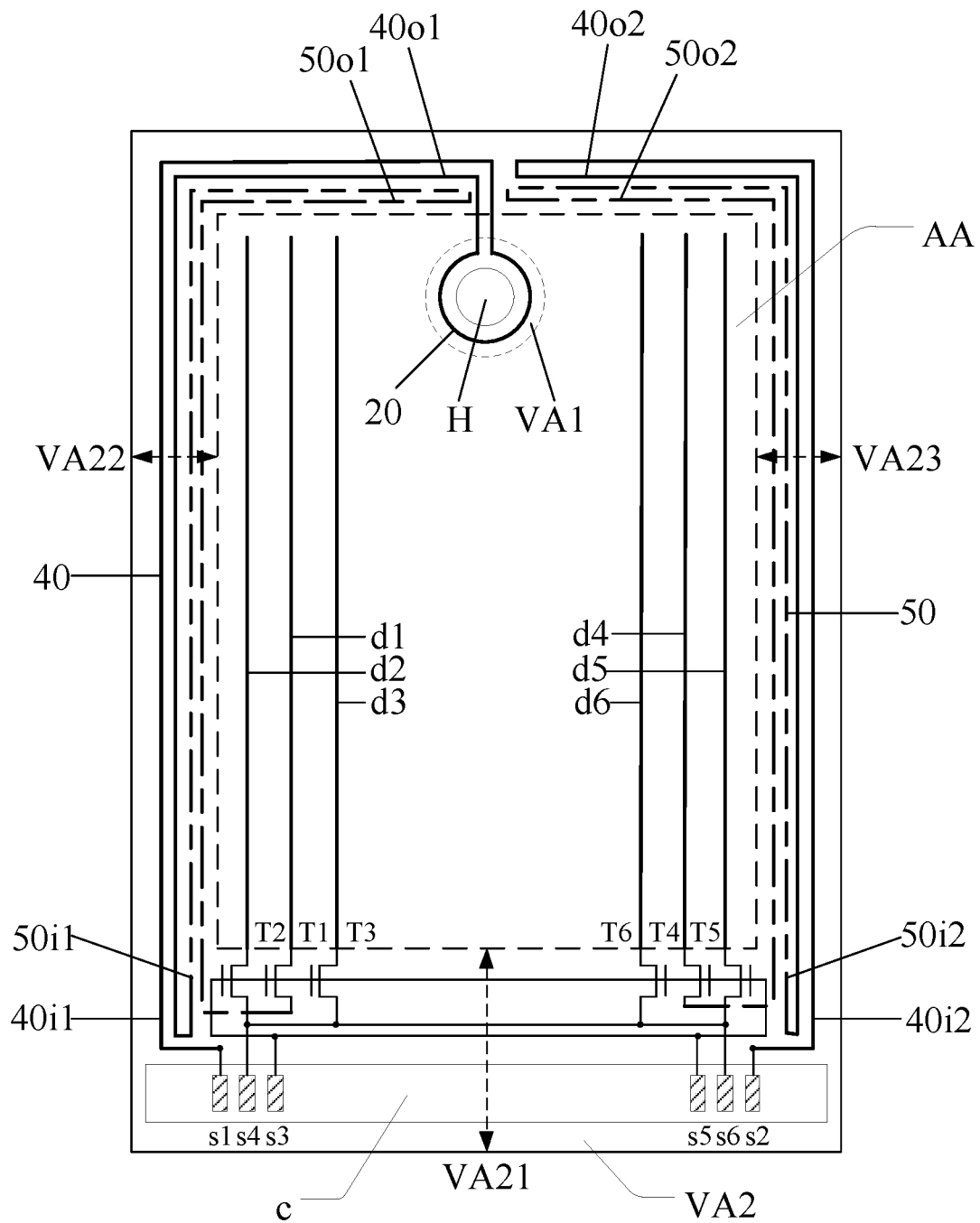
FIG. 12 is a fourth schematic diagram of a plane structure of a display panel provided by an embodiment of the present disclosure.

FIG. 12 is a fourth schematic diagram of a plane structure of a display panel provided by an embodiment of the present disclosure.

Optionally, referring to FIG. 12, the peripheral non-display area VA2 further includes a panel crack detecting line 50 arranged around the edge of the display area AA. A part of the panel crack detecting line 50 extends along the second area VA22, and another part of the panel crack detecting line 50 extends along the third area VA23. The panel crack detecting line 50 and a metal layer in the driving circuit layer 120 may be formed by using the same composition process. The panel crack detecting line 50 is used to detect cracks at the edge of the peripheral non-display area. Embodiments of the present disclosure borrow an original detecting circuit of the panel crack detecting line to connect the through-hole crack detecting line, the peripheral crack detecting line and the panel crack detecting line.

The peripheral crack detecting line 40 in the second area VA22 is connected to the first pole of the first switching transistor T1 through the panel crack detecting line 50 in the second area VA22. The peripheral crack detecting line 40 in the third area VA23 is connected to the first pole of the fourth switching transistor T4 through the panel crack detecting line 50 in the third area VA23.

The panel crack detecting line 50 includes input portions (50i1 and 50i2) and output portions (50o1 and 50o2).

The input portion 50i1 of the panel crack detecting line in the second area VA22 is connected to the output portion 40o1 of the peripheral crack detecting line in the second area VA22. The input portion 50i1 takes a position connected to the peripheral crack detecting line as the starting point to extend to a position near the through hole H around the display area along the second area VA22, so as to be connected to one end of the output portion 50o1 of the panel crack detecting line in the second area VA22. The output portion 50o1 of the panel crack detecting line in the second area VA22 takes the position connected to the input portion 50i1 as the starting point to extend back to the first area VA21 around the display area along the second area VA22, so as to be connected to the first pole of the first switching transistor T1.

The input portion 50i2 of the panel crack detecting line in the third area VA23 is connected to the output portion 40o2 of the peripheral crack detecting line in the third area VA23. The input portion 50i2 takes the position connected to the peripheral crack detecting line as the starting point to extend to the position near the through hole H around the display area along the third area VA23, so as to be connected to one end of the output portion 50o2 of the panel crack detecting line in the third area VA23. The output portion 50o2 of the panel crack detecting line in the third area VA23 takes the position connected to the input portion 50i2 as the starting point to extend back to the first area VA21 around the display area along the third area VA23, so as to be connected to the first pole of the fourth switching transistor T4.

The first output pin s1 of the driving chip 'c' outputs the first detecting signal to the peripheral crack detecting line in the second area VA22, and the third output pin s3 of the driving chip 'c' outputs the first control signal to the control poles of the first switching transistor T1, the second switching transistor T2 and the third switching transistor T3, so that the first switching transistor T1, the second switching transistor T2 and the third switching transistor T3 are all turned on. The fourth output pin s4 of the driving chip 'c' outputs the first auxiliary detecting signal to the first poles of the second switching transistor T2 and the third switching transistor T3. It can be seen by observing FIG. 11 that the first detecting signal output by the first output pin s1 is ultimately transmitted to the data signal line d1 of the display area through the peripheral crack detecting line and the panel crack detecting line in the second area VA22, and the through-hole crack detecting line 20. The first auxiliary detecting signal output by the fourth output pin s4 is transmitted to the data signal line d2 and the data signal line d3 in the display area through the second switching transistor T2 and the third switching transistor T3.

The above first detecting signal and first auxiliary detecting signal may be the high-level signal that maintains the pixel unit connected to the data signal line in the dark state. If there are no cracks generated on the edge of the second area VA22 and the edge of the through hole H of the display panel, the first detecting signal may be smoothly transmitted to the data signal line d1 of the display area through the peripheral crack detecting line and the panel crack detecting line in the second area VA22, and the through-hole crack detecting line 20, so that the pixel unit connected to the data signal line d1 presents the dark state. The two columns of pixel units connected to the data signal line d2 and the data signal line d3 also present the dark state under the control of the first auxiliary detecting signal, so that a difference between display brightness of the pixel units connected to the data signal line d1 and display brightness of the two columns of pixel units connected to the data signal line d2 and the data signal line d3 on both sides of the data signal line d1 is within a threshold range, thus characterizing that there are no cracks generated on the edge of the second area VA22 and the edge of the through hole H of the display panel.

If there is a crack generated at any position of the edge of the second area VA22 and the edge of the through hole H of the display panel, the crack detecting line at the position with the crack generated will be disconnected, the first detecting signal cannot be transmitted to the data signal line d1 of the display area, and the potential on the data signal line d1 is the low potential, so that the pixel units connected to the data signal line d1 are lighted up to form the bright line in the display area. The two columns of pixel units connected to the data signal line d2 and the data signal line d3 still present the dark state under the control of the first auxiliary detecting signal, so that the difference between the display brightness of the pixel units connected to the data signal line d1 and the display brightness of the two columns of pixel units connected to the data signal line d2 and the data signal line d3 on both sides of the data signal d1 exceeds the threshold range, thus characterizing that there is the crack generated at the edge of the second area VA22 and/or the edge of the through hole H of the display panel.

Similarly, the second output pin s2 of the driving chip 'c' outputs the second detecting signal to the peripheral crack detecting line in the third area VA23, and the fifth output pin s5 of the driving chip 'c' outputs the second control signal to the control poles of the fourth switching transistor T4, the fifth switching transistor T5, and the sixth switching transistor T6, so that the fourth switching transistor T4, the fifth switching transistor T5, and the sixth switching transistor T6 are all turned on. The sixth output pin s6 of the driving chip 'c' outputs the second auxiliary detecting signal to the first poles of the fifth switching transistor T5 and the sixth switching transistor T6. It can be seen by observing FIG. 11 that the second detecting signal output by the second output pin s2 is ultimately transmitted to the data signal line d4 of the display area through the peripheral crack detecting line and the panel crack detecting line in the third area VA23. The second auxiliary detecting signal output by the sixth output pin s6 is transmitted to the data signal line d5 and the data signal line d6 in the display area through the fifth switching transistor T5 and the sixth switching transistor T6.

The above second detecting signal and second auxiliary detecting signal may be the high-level signal that maintains the pixel unit connected to the data signal line in the dark state. If there are no crack generated on the edge of the third area VA23 of the display panel, the second detecting signal may be smoothly transmitted to the data signal line d4 of the display area through the peripheral crack detecting line and the panel crack detecting line in the third area VA23, so that the pixel unit connected to the data signal line d4 presents the dark state. The two columns of pixel units connected to the data signal line d5 and the data signal line d6 also present the dark state under the control of the second auxiliary detecting signal, so that a difference between display brightness of the pixel units connected to the data signal line d4 and display brightness of the two columns of pixel units connected to the data signal line d5 and the data signal line d6 on both sides of the data signal line d4 is within the threshold range, thus characterizing that there are no crack generated on the edge of the third area VA23 of the display panel.

If there is a crack generated at any position of the edge of the third area VA23 of the display panel, the peripheral crack detecting line at the position with the crack generated will be disconnected, the second detecting signal cannot be transmitted to the data signal line d4 of the display area, and the potential on the data signal line d4 is the low potential, so that the pixel units connected to the data signal line d4 are lighted up to form the bright line in the display area. The two columns of pixel units connected to the data signal line d5 and the data signal line d6 still present the dark state under the control of the second auxiliary detecting signal, so that the difference between the display brightness of the pixel units connected to the data signal line d4 and the display brightness of the two columns of pixel units connected to the data signal line d5 and the data signal line d6 on both sides of the data signal line d4 exceeds the threshold range, thus characterizing that there is the crack generated at the edge of the third area VA23 of the display panel.

When it is detected that there are cracks on the panel, electrical parameters of the peripheral crack detecting line, the panel crack detecting line, and the through-hole crack detecting line may be further detected to determine the position of the cracks generated.

Optionally, embodiments of the present disclosure may perform crack detection through another mode.

Figure 13:
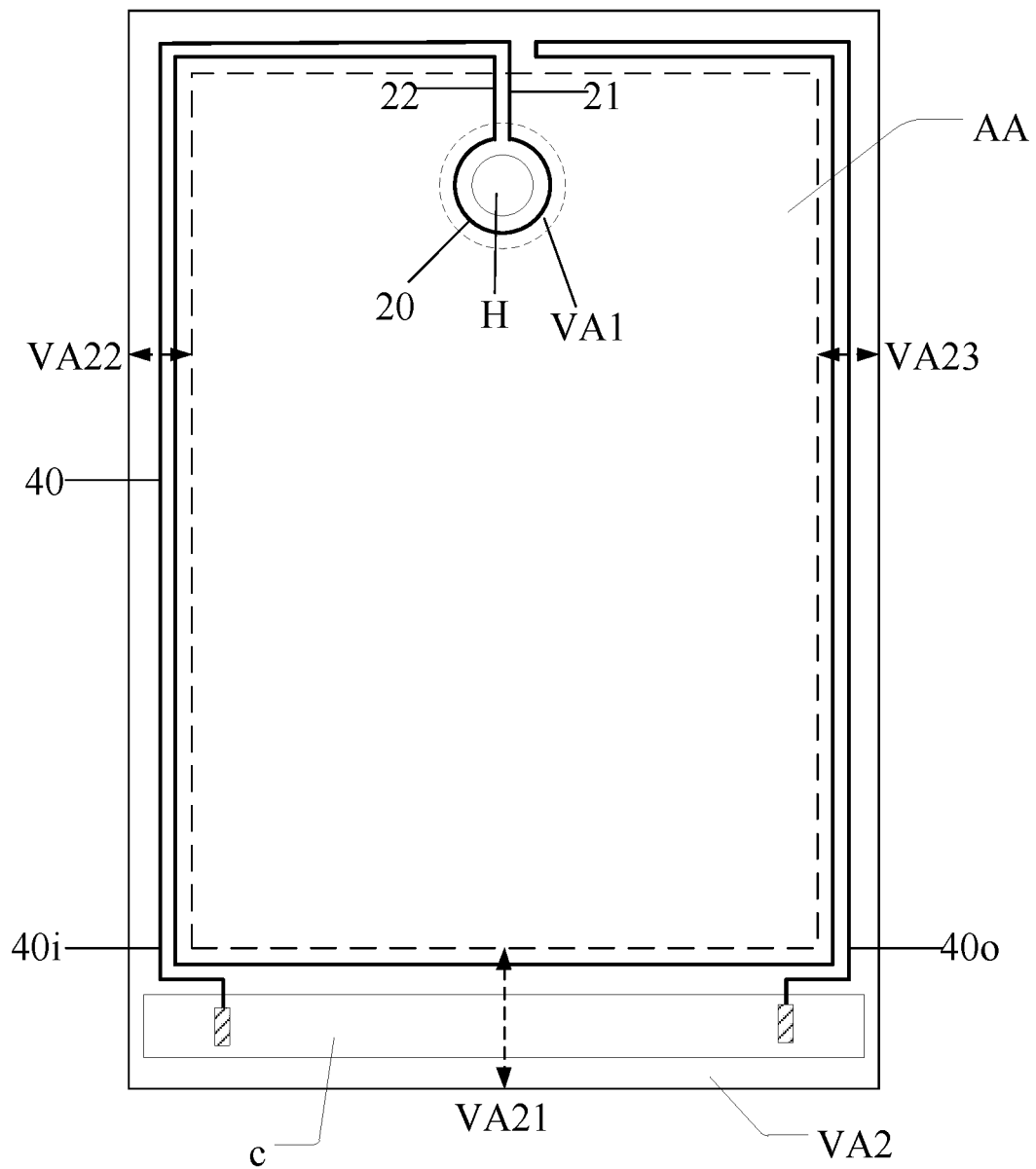
FIG. 13 is a fifth schematic diagram of a plane structure of a display panel provided by an embodiment of the present disclosure.

FIG. 13 is a fifth schematic diagram of a plane structure of a display panel provided by an embodiment of the present disclosure.

Referring to FIG. 13, the peripheral crack detecting line includes an input portion 40i and an output portion 40o. One end of the input portion 40i is connected to a pin of the driving chip 'c'. The input portion 40i takes a position connected to the driving chip 'c' as a starting point to extend to a position of the through hole H around the display area along the second area VA22, so as to be connected to the input wiring portion 21 of the through-hole crack detecting line 20. One end of the output portion 40o is connected to the output wiring portion 22 of the through-hole crack detecting line 20. The output portion 40o takes a position connected to the output wiring portion 22 as a starting point to extend to the first area VA21 around the display area along the second area VA22, extend to the third area VA23 around the display area along the first area VA21, extend to the position near the through hole H around the display area along the third area VA23, and extend back to the first area VA21 from the position near the through hole around the display area along the third area VA23, so as to be connected to another pin of the driving chip 'c'.

It can be seen from FIG. 13 that the peripheral crack detecting line 40 and through-hole crack detecting line 20 used to detect the cracks on the display panel are interconnected to form a wire around the edge of the display area. By connecting two ends of the wire onto the two pins of the driving chip 'c', a resistance value of the wire may be detected. When there are no cracks generated on the peripheral edge and the edge of the through hole of the display panel, it is detected that a resistance value between the two pins of the driving chip 'c' is the resistance value of the above wire. When there are cracks generated on the peripheral edge and/or the edge of the through hole of the display panel, the above wire will be disconnected, and the resistance value between the two pins of the driving chip 'c' is infinite. By detecting the resistance value between the two pins connected to the driving chip 'c', it may be determined whether the cracks are generated on the peripheral edge and the edge of the through hole of the display panel.

Alternatively, when one pin of the driving chip 'c' output a detecting signal, a feedback signal may be received by the other pin of the driving chip 'c' after the detecting signal passes through the above wire. When there are no cracks generated on the peripheral edge and the edge of the through hole of the display panel, a difference value between the detecting signal and the feedback signal is voltage drop caused by the resistance of the wire. Therefore, when the difference between the feedback signal and the detecting signal is within the set threshold range, it may be characterized that there are no cracks generated on the peripheral edge and the edge of the through hole of the display panel. When there are cracks generated on the peripheral edge and/or the edge of the through hole of the display panel, the above wire will be disconnected, the pin of the driving chip 'c' cannot receive the feedback signal, so that the difference between the feedback signal and the detecting signal exceeds the threshold range, thus characterizing that there are cracks generated on the peripheral edge and/or the edge of the through hole of the display panel.

Embodiments of the present disclosure may also separate the crack detection for the edge of the through hole from the crack detection for the peripheral edge.

Figure 14:
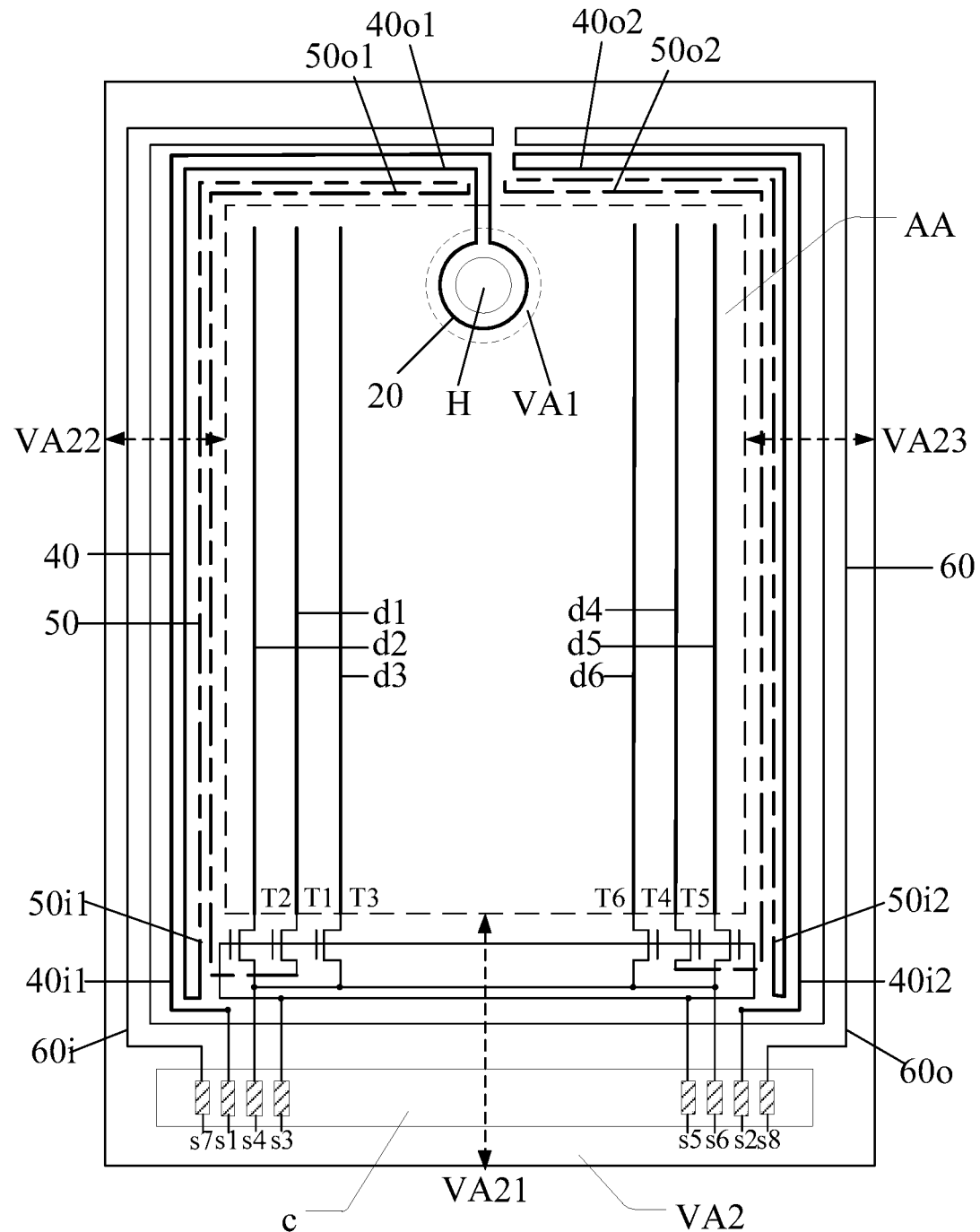
FIG. 14 is a sixth schematic diagram of a plane structure of a display panel provided by an embodiment of the present disclosure.

FIG. 14 is a sixth schematic diagram of a plane structure of a display panel provided by an embodiment of the present disclosure.

Referring to FIG. 14, the display panel includes: a through-hole crack detecting line 20, a peripheral crack detecting line 40, a panel crack detecting line 50, and a crack detection winding line 60.

Positions and connection relationships of the through-hole crack detecting line 20, the peripheral crack detecting line 40, and the panel crack detecting line 50 in the display panel are the same as those in FIG. 12, and its connection structure and crack detecting principle may refer to the relevant introduction in FIG. 12, which will not be repeated here.

The crack detection winding line 60 in FIG. 14 is located on the periphery of the peripheral crack detecting line 40. There is no connection relationship between the crack detection winding line 60 and the through-hole crack detecting line 20, the peripheral crack detecting line 40, as well as the panel crack detecting line 50. A connection relationship and a crack detection principle between the crack detection winding line 60 and the driving chip 'c' may refer to the relevant introduction of (peripheral crack detecting line) 40 in FIG. 13, which is not limited here.

When performing crack detection on the display panel, the output pins (s1-s8) of the driving chip 'c' output corresponding signals. The crack detection at the position of the through hole is performed in a mode of the display brightness of the pixel unit in the display area, and the crack detection at the peripheral position of the display panel is performed by measuring a resistance value of the crack detection winding line. In this way, when a loop where the crack detection winding line 60 is located does not detect the cracks generated on the display panel, but a loop where the through-hole crack detecting line 20, the peripheral crack detecting line 40, and the panel crack detecting line 50 are located detects the cracks generated on the display panel, it indicates that the cracks are generated at the position of the through hole. When the loop where the crack detection winding line 60 is located detects the cracks generated on the display panel, and meanwhile the loop where the through-hole crack detecting line 20, the peripheral crack detecting line 40, and the panel crack detecting line 50 are located also detects the cracks generated on the display panel, it indicates that the cracks are generated on the periphery of the display panel.

Based on the same inventive concept, embodiments of the present disclosure further provide a display apparatus including any of the above display panel. Principles of the display apparatus for solving the problems are similar to that of the above display panel, therefore, implementation of the display apparatus may refer to that of the above display panel, and repetitions are omitted.

Although the preferred embodiments of the present disclosure have been described, those skilled in the art can make additional alterations and modifications on these embodiments once they know the basic creative concept. Therefore, the appended claim intends to be explained as including the preferred embodiments and all alterations and modifications falling within the scope of the present disclosure.

Apparently, those skilled in the art can make various modifications and variations to the embodiment of the present disclosure without departing from the spirit and scope of the embodiment of the present disclosure. In this way, if these modifications and variations of the embodiments of the present disclosure fall within the scope of the claims of the present disclosure and their equivalent art, the present disclosure also intends to include these modifications and variations.

What is claimed is:

1. A display panel, comprising:
   a display area, used for image display and comprising:
      at least one through hole; and
   an annular non-display area, located between the through hole and the display area enclosing the through hole and comprising:
      at least two annular blocking dams;
      wherein the annular blocking dams enclose the through hole and are mutually nested, and adjacent annular blocking dams are spaced at a predetermined distance;
      a through-hole crack detecting line, configured to perform crack detection on an edge of the through hole and comprising:
         an input wiring portion,
         an output wiring portion, and
         a winding portion,
         wherein the input wiring portion and the output wiring portion are connected through the winding portion, the input wiring portion and the output wiring portion extend to the display area, and the winding portion is around the edge of the through hole; and
      a connecting portion between the annular blocking dams and connecting some areas of the annular blocking dams.

2. The display panel according to claim 1, wherein the annular non-display area comprises:
   a first annular blocking dam, enclosing the through hole; and
   a second annular blocking dam, enclosing the first annular blocking dam;
   wherein the connecting portion is between the first annular blocking dam and the second annular blocking dam and connects some areas of the first annular blocking dam and the second annular blocking dam.

3. The display panel according to claim 2, wherein the annular non-display area comprises one connecting portion;
   the input wiring portion and the output wiring portion respectively extend from the display area into the first annular blocking dam, and orthographic projections of both the input wiring portion and the output wiring portion in the annular non-display area have overlapping areas with an orthographic projection of the connecting portion in the annular non-display area; and the winding portion is in the first annular blocking dam, and surrounds the through hole by taking an end of the input wiring portion in the first annular blocking dam as a starting point and taking an end of the output wiring portion in the first annular blocking dam as an end point; and
   the input wiring portion and the output wiring portion are spaced at a predetermined distance.

4. The display panel according to claim 2, wherein the annular non-display area comprises two connecting portions of a first connecting portion and a second connecting portion; and the first connecting portion and the second connecting portion are on a same side of the through hole, and the first connecting portion and the second connecting portion are spaced at a predetermined distance; and
   the input wiring portion extends from the display area into the first annular blocking dam, and an orthographic projection of the input wiring portion in the annular non-display area has an overlapping area with an orthographic projection of the first connecting portion in the annular non-display area; the output wiring portion extends from the display area into the first annular blocking dam, and an orthographic projection of the output wiring portion in the annular non-display area has an overlapping area with an orthographic projection of the second connecting portion in the annular non-display area; and the winding portion is in the first annular blocking dam, and surrounds the through hole by taking an end of the input wiring portion in the first annular blocking dam as a starting point and taking an end of the output wiring portion in the first annular blocking dam as an end point.

5. The display panel according to claim 2, wherein the annular non-display area comprises two connecting portions of a first connecting portion and a second connecting portion; the first connecting portion is on one side of the through hole, and the second connecting portion is on an opposite side of the through hole; and the first annular blocking dam and the second annular blocking dam are cut to be at a first side and a second side which are oppositely arranged by the first connecting portion and the second connecting portion;
the input wiring portion extends from the display area to a position between the first annular blocking dam and the second annular blocking dam at the first side, an orthographic projection of the input wiring portion in the annular non-display area has an overlapping area with an orthographic projection of the second annular blocking dam in the annular non-display area, the orthographic projection of the input wiring portion in the annular non-display area and an orthographic projection of the first connecting portion in the annular non-display area do not overlap, and the input wiring portion is adjacent to the first side of the first connecting portion; and the output wiring portion extends from the display area to the position between the first annular blocking dam and the second annular blocking dam at the second side, an orthographic projection of the output wiring portion in the annular non-display area has an overlapping area with the orthographic projection of the second annular blocking dam in the annular non-display area, the orthographic projection of the output wiring portion in the annular non-display area and the orthographic projection of the first connecting portion in the annular non-display area do not overlap, and the output wiring portion is adjacent to the second side of the first connecting portion;
the winding portion comprises a first connecting wire portion, a second connecting wire portion, a first winding portion, a second winding portion, and a third winding portion; and
the first connecting wire portion extends from the position between the first annular blocking dam and the second annular blocking dam into the first annular blocking dam at the first side, an orthographic projection of the first connecting wire portion in the annular non-display area has an overlapping area with an orthographic projection of the first annular blocking dam in the annular non-display area, the orthographic projection of the first connecting wire portion in the annular non-display area and an orthographic projection of the second connecting portion in the annular non-display area do not overlap, and the first connecting wire portion is adjacent to the first side of the second connecting portion; the second connecting wire portion extends from the position between the first annular blocking dam and the second annular blocking dam into the first annular blocking dam at the second side, an orthographic projection of the second connecting wire portion in the annular non-display area has an overlapping area with the orthographic projection of the first annular blocking dam in the annular non-display area, the orthographic projection of the second connecting wire portion in the annular non-display area and the orthographic projection of the second connecting portion in the annular non-display area do not overlap, and the second connecting wire portion is adjacent to the second side of the second connecting portion; the first winding portion is between the first annular blocking dam and the second annular blocking dam at the first side, and connects the input wiring portion with the first connecting wire portion; the second winding portion is between the first annular blocking dam and the second annular blocking dam t the second side, and connects the output wiring portion with the second connecting wire portion; and the third winding portion is in the first annular blocking dam, and surrounds the through hole by taking an end of the first connecting wire portion in the first annular blocking dam as a starting point and taking an end of the second connecting wire portion in the first annular blocking dam as an end point.

6. The display panel according to claim 1, wherein the display area comprises:
a base substrate;
a driving circuit layer on the base substrate;
an organic light-emitting diode device layer on one side of the driving circuit layer facing away from the base substrate;
an encapsulation layer on one side of the organic light-emitting diode device layer facing away from the base substrate; and
a touch control functional layer on one side of the encapsulation layer facing away from the organic light-emitting diode device layer;
wherein the touch control functional layer comprises at least one metal layer, and the through-hole crack detecting line is arranged on a same layer as one metal layer in the touch control functional layer.

7. The display panel according to claim 6, wherein the touch control functional layer comprises:
a touch control blocking layer on a surface of one side of the encapsulation layer facing away from the organic light-emitting diode device layer;
a first touch control electrode layer on a surface of one side of the touch control blocking layer facing away from the encapsulation layer;
an insulating layer on a surface of one side of the first touch control electrode layer facing away from the touch control blocking layer;
a second touch control electrode layer on a surface of one side of the insulating layer facing away from the first touch control electrode layer; and
a protection layer on a surface of one side of the second touch control electrode layer facing away from the insulating layer;
wherein the through-hole crack detecting line is arranged on the same layer as the first touch control electrode layer or the second touch control electrode layer.

8. The display panel according to claim 6, wherein:
the driving circuit layer comprises:
a buffer layer on the base substrate;
an active layer on one side of the buffer layer facing away from the base substrate;
a gate insulating layer on one side of the active layer facing away from the buffer layer;

a gate metal layer on one side of the gate insulating layer facing away from the active layer;
an interlayer insulating layer on one side of the gate metal layer facing away from the gate insulating layer;
a source-drain metal layer on one side of the interlayer insulating layer facing away from the gate metal layer; and
a planarization layer on one side of the source-drain metal layer facing away from the interlayer insulating layer; and the organic light-emitting diode device layer comprises:
a first electrode layer, located on one side of the planarization layer facing away from the source-drain metal layer, and comprising a plurality of mutually discrete first electrodes;
a pixel defining layer, located on one side of the planarization layer facing away from the source-drain metal layer, and located at a spacing position between the first electrodes;
a supporting portion on one side of the pixel defining layer facing away from the planarization layer;
a light-emitting layer on one side of the first electrodes facing away from the planarization layer; and
a second electrode layer on one side of the light-emitting layer, the pixel defining layer and the supporting portion facing away from the planarization layer;
wherein the annular blocking dams comprises a plurality of stacked film layers, and the film layers comprised by the annular blocking dams are arranged on a same layer as at least one of the planarization layer, the pixel defining layer, or the supporting portion respectively.

9. The display panel according to claim 1, further comprising:
a peripheral non-display area, enclosing the display area and comprising;
a driving chip in the peripheral non-display area on one side of the display area; and
a peripheral crack detecting line, configured to perform crack detecting on a peripheral edge of the display panel, and arranged around an edge of the display area; wherein at least part of the peripheral crack detecting line is connected to the through-hole crack detecting line, and at least one end of the peripheral crack detecting line is connected to the driving chip;
wherein part of the peripheral non-display area at a side edge, where the driving chip is located, of the display area is a first area, and parts of the peripheral non-display area at two side edges, adjacent to the side edge where the driving chip is located, of the display area are a second area and a third area respectively; and a part of the peripheral crack detecting line extends along the second area, and another part of the peripheral crack detecting line extends along the third area.

10. The display panel according to claim 9, wherein:
the display area comprises:
a plurality of pixel units, distributed in an array to form a plurality of pixel unit columns; and
a plurality of data signal lines, extending in a direction of the pixel unit columns, one data signal line being connected to one column of pixel units;
the peripheral crack detecting line comprises:
an input portion, and
an output portion;

wherein one end of the input portion of the peripheral crack detecting line in the second area is connected to a pin of the driving chip, and the input portion takes a position connected to the driving chip as a starting point to extend to a position of the through hole around the display area along the second area, and is connected to the input wiring portion of the through-hole crack detecting line; and one end of the output portion of the peripheral crack detecting line in the second area is connected to the output wiring portion of the through-hole crack detecting line, and the output portion takes a position connected to the output wiring portion as a starting point to extend to the first area around the display area along the second area, and is connected to a data signal line of the display area; and
one end of the input portion of the peripheral crack detecting line in the third area is connected to another pin of the driving chip, and the input portion takes the position connected to the driving chip as a starting point to extend to a position near the through hole around the display area along the third area, and is connected to one end of the output portion of the peripheral crack detecting line in the third area; and the output portion of the peripheral crack detecting line in the third area takes a position connected to the input portion as a starting point to extend to the first area around the display area along the third area, and is connected to another data signal line of the display area.

11. The display panel according to claim 10, wherein the input portion of the peripheral crack detecting line in the second area is connected to a first output pin of the driving chip, and the input portion of the peripheral crack detecting line in the third area is connected to a second output pin of the driving chip;
the peripheral non-display area further comprises:
a first switching transistor in the first area, wherein a control pole of the first switching transistor is connected to a third output pin of the driving chip, a first pole of the first switching transistor is connected to the output portion of the peripheral crack detecting line in the second area, and a second pole of the first switching transistor is connected to a first data signal line in the display area;
a second switching transistor in the first area and adjacent to the first switching transistor, wherein a control pole of the second switching transistor is connected to the control pole of the first switching transistor, a first pole of the second switching transistor is connected to a fourth output pin of the driving chip, and a second pole of the second switching transistor is connected to a second data signal line in the display area;
a third switching transistor in the first area and on one side of the first switching transistor facing away from the second switching transistor, wherein a control pole of the third switching transistor is connected to the control pole of the first switching transistor, a first pole of the third switching transistor is connected to the fourth output pin of the driving chip, and a second pole of the third switching transistor is connected to a third data signal line in the display area; and the second data signal line and the third data signal line are respectively on two sides of the first data signal line;

a fourth switching transistor in the first area, wherein a control pole of the fourth switching transistor is connected to a fifth output pin of the driving chip, a first pole of the fourth switching transistor is connected to the output portion of the peripheral crack detecting line in the third area, and a second pole of the fourth switching transistor is connected to a fourth data signal line in the display area;

a fifth switching transistor in the first area and adjacent to the fourth switching transistor, wherein a control pole of the fifth switching transistor is connected to the control pole of the fourth switching transistor, a first pole of the fifth switching transistor is connected to a sixth output pin of the driving chip, and a second pole of the fifth switching transistor is connected to a fifth data signal line in the display area; and a sixth switching transistor in the first area and on one side of the fourth switching transistor facing away from the fifth switching transistor, wherein a control pole of the sixth switching transistor is connected to the control pole of the fourth switching transistor, a first pole of the sixth switching transistor is connected to the sixth output pin of the driving chip, and a second pole of the sixth switching transistor is connected to a sixth data signal line in the display area; and the fifth data signal line and the sixth data signal line are respectively on two sides of the fourth data signal line.

12. The display panel according to claim 11, wherein the peripheral non-display area further comprises:

a panel crack detecting line arranged around an edge position of the display area, wherein a part of the panel crack detecting line extends along the second area, and another part of the panel crack detecting line extends along the third area; and wherein the peripheral crack detecting line in the second area is connected to the first pole of the first switching transistor through the panel crack detecting line in the second area, and the peripheral crack detecting line in the third area is connected to the first pole of the fourth switching transistor through the panel crack detecting line in the third area;

the panel crack detecting line comprises an input portion and an output portion;

the input portion of the panel crack detecting line in the second area is connected to the output portion of the peripheral crack detecting line in the second area, and the input portion takes a position connected to the peripheral crack detecting line as a starting point to extend to a position near the through hole around the display area along the second area, and is connected to one end of the output portion of the panel crack detecting line in the second area; and the output portion of the panel crack detecting line in the second area takes a position connected to the input portion as a starting point to extend back to the first area around the display area along the second area, and is connected to the first pole of the first switching transistor; and the input portion of the panel crack detecting line in the third area is connected to the output portion of the peripheral crack detecting line in the third area, and the input portion takes a position connected to the peripheral crack detecting line as a starting point to extend to a position near the through hole around the display area along the third area, and is connected to one end of the output portion of the panel crack detecting line in the third area; and the output portion of the panel crack detecting line in the third area takes a position connected to the input portion as a starting point to extend back to the first area around the display area along the third area, and is connected to the first pole of the fourth switching transistor.

13. The display panel according to claim 9, wherein the peripheral crack detecting line comprises:

an input portion, and an output portion;

wherein one end of the input portion is connected to a pin of the driving chip, and the input portion takes a position connected to the driving chip as a starting point to extend to a position of the through hole around the display area along the second area, and is connected to the input wiring portion of the through-hole crack detecting line; and one end of the output portion is connected to the output wiring portion of the through-hole crack detecting line, and the output portion takes a position connected to the output wiring portion as a starting point to extend to the first area around the display area along the second area, extend to the third area around the display area along the first area, extend to a position near the through hole around the display area along the third area, and extend back to the first area from the position near the through hole around the display area along the third area, and is connected to another pin of the driving chip.

14. A display apparatus, comprising the display panel according to claim 1.

* * * * *